United States Patent
Demoor et al.

(10) Patent No.: US 11,080,239 B2
(45) Date of Patent: Aug. 3, 2021

(54) KEY VALUE STORE USING GENERATION MARKERS

(71) Applicant: Western Digital Technologies, Inc., San Jose, CA (US)

(72) Inventors: Thomas Demoor, Ghent (BE); Carl Rene D'Halluin, Zwijnaarde (BE)

(73) Assignee: Western Digital Technologies, Inc., San Jose, CA (US)

( * ) Notice: Subject to any disclaimer, the term of this patent is extended or adjusted under 35 U.S.C. 154(b) by 117 days.

(21) Appl. No.: 16/367,080

(22) Filed: Mar. 27, 2019

(65) Prior Publication Data
US 2020/0311029 A1    Oct. 1, 2020

(51) Int. Cl.
| G06F 7/00 | (2006.01) |
|---|---|
| G06F 16/00 | (2019.01) |
| G06F 16/17 | (2019.01) |
| G06F 12/02 | (2006.01) |
| G06F 3/06 | (2006.01) |

(52) U.S. Cl.
CPC ........ *G06F 16/1734* (2019.01); *G06F 3/0604* (2013.01); *G06F 3/0632* (2013.01); *G06F 12/0253* (2013.01); *G06F 3/067* (2013.01)

(58) Field of Classification Search
None
See application file for complete search history.

(56) References Cited

U.S. PATENT DOCUMENTS

| 9,047,312 B1 | 6/2015 | Ten-Pow et al. |
|---|---|---|
| 9,971,526 B1* | 5/2018 | Wei .................. G06F 3/0619 |
| 2005/0060609 A1 | 3/2005 | El-Batal et al. |
| 2010/0083004 A1* | 4/2010 | Kirshenbaum ..... G06F 21/6218 713/193 |
| 2010/0223274 A1 | 9/2010 | DeHaan et al. |
| 2010/0235814 A1* | 9/2010 | Ohta ................... G06F 11/3684 717/124 |
| 2010/0318746 A1 | 12/2010 | Troxel et al. |
| 2016/0034504 A1 | 2/2016 | Borah |
| 2016/0308965 A1* | 10/2016 | Yamakawa ......... H04L 67/1097 |
| 2016/0321294 A1 | 11/2016 | Wang et al. |
| 2019/0278854 A1 | 9/2019 | Newman |

OTHER PUBLICATIONS

Ma, et al., IEEE Docs—https://ieeexplore.ieee.org/document/7336969/, log-based change data capture from Schema-free Document Stores using MapReduce, 2015, p. 1-6.

* cited by examiner

*Primary Examiner* — Tuan A Pham
(74) *Attorney, Agent, or Firm* — Patent Law Works LLP

(57) ABSTRACT

Example storage systems and methods provide data storage management using generation markers in a key data store. A key data store includes a set of key data entries that each include a key value and a property value associated with a storage operation. An active generation of the key data entries include an active generation marker and a base generation does not. A base storage parameter is calculated from a data scan and a current storage parameter is calculated from the base storage parameter and the property values of the active generation of key data entries. The calculated storage parameter may be reported to manage storage configuration and operations in the storage system.

20 Claims, 9 Drawing Sheets

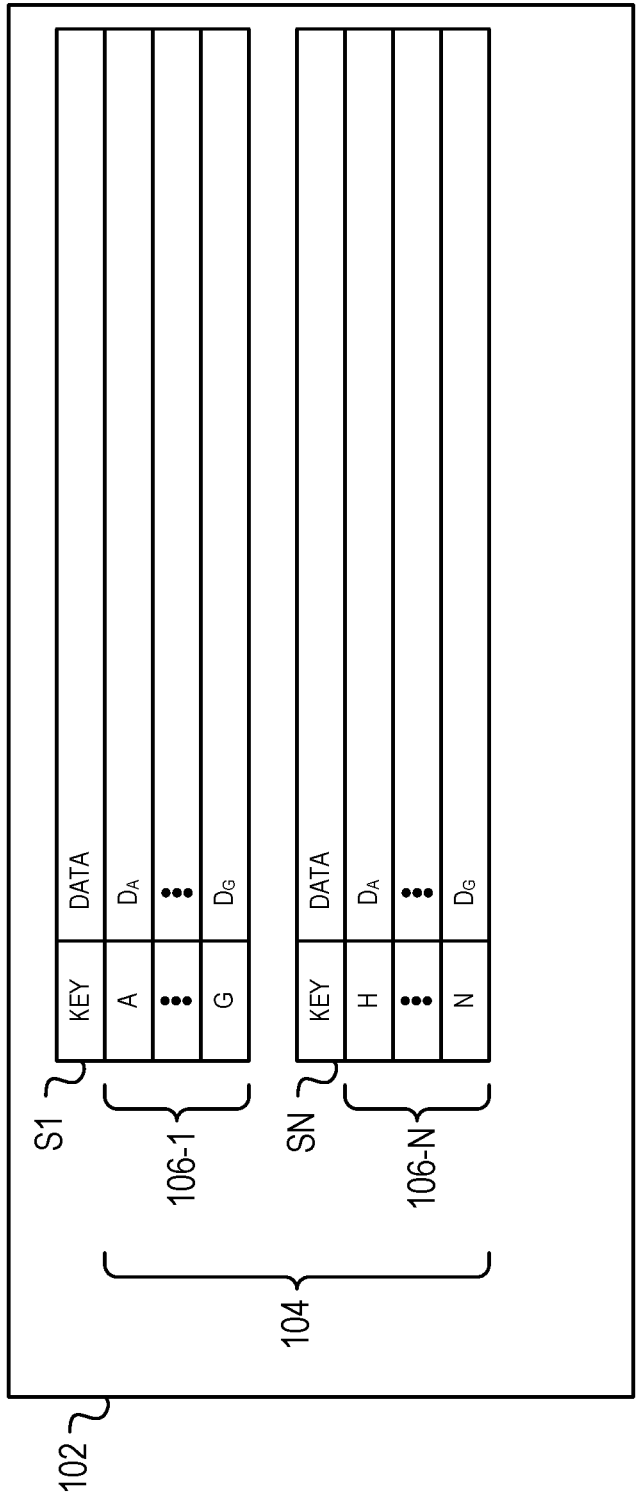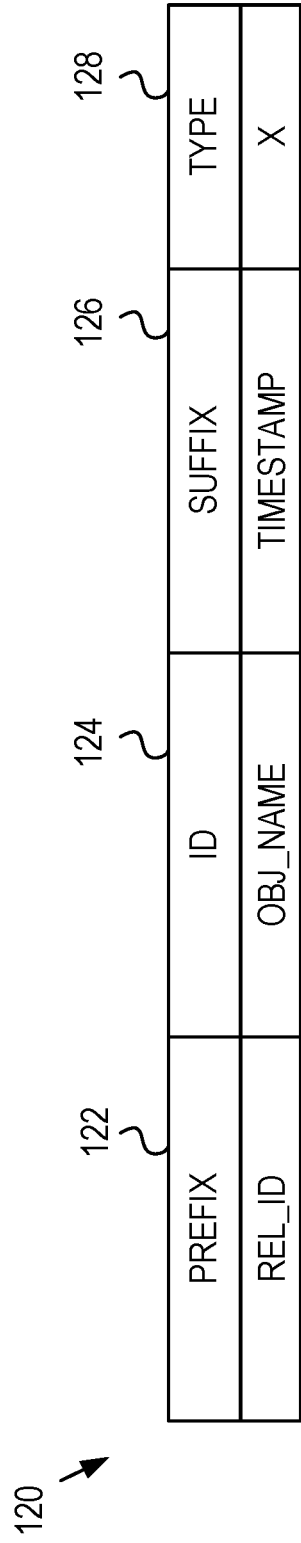
FIG. 1A
FIG. 1B

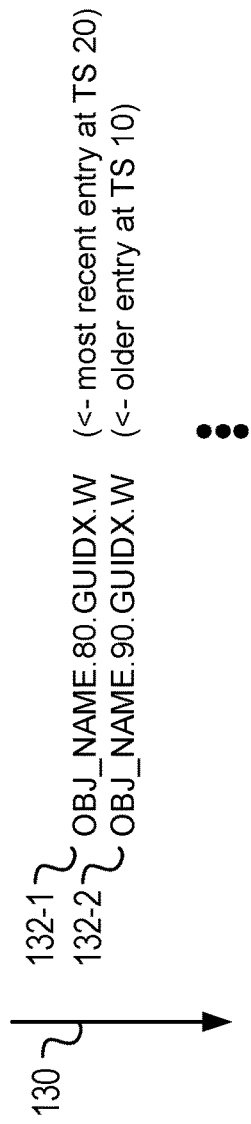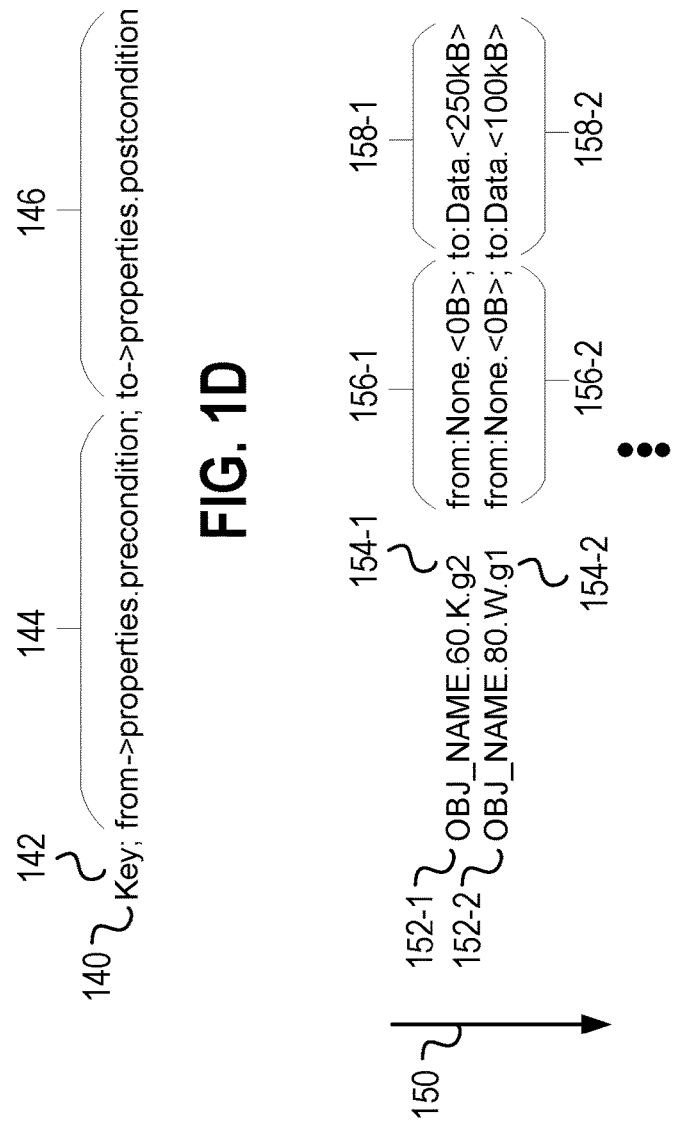

KEY VALUE STORE USING GENERATION MARKERS

TECHNICAL FIELD

The present disclosure generally relates to data storage systems using a database to manage changing data property values. In a more particular non-limiting example, the present disclosure relates to using key value stores for logging data properties.

BACKGROUND

The rise in electronic and digital device technology has rapidly changed the way society communicates, interacts, and consumes goods and services. Digital technology enables a variety of electronic devices to be available that can be used for a variety of purposes and are relatively cheap. Specifically, modern electronic devices, such as desktop computers, laptops, smart phones, and tablets, allow a user to have access to a variety of useful applications nearly constantly. Using such applications results in the generation of an increasingly huge amount of data. Storing and retrieving the produced data efficiently is a significant challenge.

As the amount of data and rate of change of stored data increases, the ability to collect accurate and timely information about the stored data becomes both more important and more challenging. For example, storage system parameters, such as storage capacity, may change with every data storage transaction processed by a storage system and near real-time information on storage capacity may be desired for making storage allocation and other storage management decisions.

Some solutions use a metadata database (DB) or key value stores (KVSs) in a large-scale distributed storage system (DSS) to provide a scalable log to accommodate the current growth in data. These types of DSSs generally require that log data be maintained in the metadata DB or KVS with a minimal impact on the responsiveness of the metadata DB or KVS, including limiting the processing overhead for property logging and calculation.

There may be an ongoing need for KVS data property log configurations and related processing to quickly, efficiently, and accurately maintain and update storage system parameters during the operation of DSSs. These storage system parameters may be used by the storage systems to manage configuration and storage operations on an ongoing basis.

SUMMARY

The present disclosure generally relates to a novel log configuration and related operations for data property management using generation markers in a key value store to provide data property calculations without the limitations of existing solutions, such as those discussed in the Background.

One general aspect includes a storage system that includes at least one storage node configured to execute storage operations and a key data store configured to include a log including a set of key data entries. Each of the key data entries includes a key value corresponding to at least one storage operation and at least one property value related to the at least one storage operation. An active generation subset of the key data entries of the set of key data entries includes an active generation marker value configured to designate each key data entry in the active generation subset. A base generation subset of the key data entries of the set of key data entries omits the active generation marker value. The storage system further includes at least one memory, at least one processor, and a storage application executable by the at least one processor using the at least one memory to perform operations including: calculating a base storage system parameter from the key data store; calculating a current storage system parameter using the base storage system parameter and the at least one property value of the key data entries in the active generation subset of the key data entries; and reporting the current storage system parameter.

Implementations may include one or more of the following features. The key value may include a data object identifier, an inverse timestamp, an operation identifier, and a generation marker, where the generation marker of the active generation subset includes the active generation marker value. The at least one property value of each of the key data entries in the active generation subset may include at least one precondition value and at least one postcondition value. Calculating the current storage system parameter may include calculating a difference between the at least one precondition value and the at least one postcondition value. The at least one precondition value and the at least one postcondition value may be associated with at least one operation property and each of the key data entries in the active generation subset further includes at least one operation property for the at least one precondition value and the at least one postcondition value. The storage application may be further executable to perform operations including executing garbage collection using the key data store and adding, responsive to executing garbage collection, garbage collection key data entries to the set of key data entries. The garbage collection key data entries may include the active generation marker value, calculating the base storage system parameter may be based on a data scan of the key data store without garbage collection, and calculating the current storage system parameter may be responsive to adding garbage collection key data entries to the set of key data entries. The storage application may be further executable to perform operations including: initializing an incremental key scheme, where a prior log subset of the key data entries is in the key data store at initialization and the prior log subset includes the base generation subset of the key data entries of the set of key data entries; and adding, responsive to at least one storage operation executed after initialization, at least one new key data entry in the active generation subset, where the at least one property value of the new key data entry includes at least one precondition value and at least one postcondition value; and calculating the current storage system parameter includes calculating a difference between the at least one precondition value and the at least one postcondition value. The current storage system parameter may be storage capacity and the base storage system parameter may be a base storage capacity at initialization. The set of key data entries may include a plurality of operating generations of key data entries corresponding to a plurality of sequential operating periods and each of the plurality of operating generations corresponds to a generation subset of key data entries that include a generation marker value configured to designate each of the key data entries in the generation subset.

Another general aspect includes a computer-implemented method that includes providing a key data store including a log configured to include a set of key data entries, where each of the key data entries includes a key value corresponding to at least one storage operation and at least one property value related to the at least one storage operation. The method further includes: calculating a base storage system parameter from the key data store; adding at least one key data entry to the set of key data entries, where the at least one key data entry includes an active generation marker value configured to designate the at least one key data entry in an active generation subset; calculating a current storage system parameter from the base storage system parameter and the at least one property value of the active generation subset of key data entries; and reporting the current storage system parameter.

Implementations may include one or more of the following features. The key value may include a data object identifier, an inverse timestamp, an operation identifier, and a generation marker, where the generation marker of the active generation subset includes the active generation marker value. The at least one property value of each of the key data entries in the active generation subset may include at least one precondition value and at least one postcondition value. Calculating the current storage system parameter may include calculating a difference between the at least one precondition value and the at least one postcondition value. The at least one precondition value and the at least one postcondition value may be associated with at least one operation property and each of the key data entries in the active generation subset may further include at least one operation property for the at least one precondition value and the at least one postcondition value. The computer-implemented method may further include: executing garbage collection using the key data store; and adding, responsive to garbage collection, garbage collection key data entries to the set of key data entries, where garbage collection key data entries include the active generation marker value, where calculating the base storage system parameter of the key data store is executed without garbage collection and calculating the current storage system parameter is responsive to adding garbage collection key data entries to the set of key data entries. The computer-implemented method may further include initializing an incremental key scheme, where a prior log subset of the key data entries is in the key data store at initialization and adding, responsive to at least one storage operation executed after initialization, at least one new key data entry in the active generation subset, where the at least one property value of the new key data entry includes at least one precondition value and at least one postcondition value, and calculating the current storage system parameter includes calculating a difference between the at least one precondition value and the at least one postcondition value. The current storage system parameter may be storage capacity and the base storage system parameter may be a base storage capacity at initialization. The set of key data entries may include a plurality of operating generations of key data entries corresponding to a plurality of subsequent operating periods and each of the plurality of operating generations corresponds to a generation subset of key data entries that include a generation marker value configured to designate each of the key data entries in the generation subset.

Another general aspect includes a system that includes at least one storage node configured to execute storage operations and a key data store comprising a log configured to include a set of key data entries, where each of the key data entries includes a key value corresponding to at least one storage operation and at least one property value related to the at least one storage operation, an active generation subset of the key data entries of the set of key data entries includes an active generation marker value configured to designate each of the key data entries in the active generation subset, and a base generation subset of the key data entries of the set of key data entries does not include the active generation marker value. The system further includes: means for calculating a base storage system parameter from a data scan of the key data store; means for calculating a current storage system parameter from the base storage system parameter and property values of the active generation subset of key data entries; and means for reporting the current storage system parameter.

Implementations may include one or more of the following features. The at least one property value of each of the key data entries in the active generation subset may include at least one precondition value and at least one postcondition value and the means for calculating the current storage system parameter may include calculating a difference between the at least one precondition value and the at least one postcondition value. The system may further include means for executing garbage collection using the key data store and means for adding, responsive to garbage collection, garbage collection key data entries to the set of key data entries, where garbage collection key data entries include the active generation marker value. Calculating the base storage system parameter from the key data store may be executed without garbage collection and calculating the current storage system parameter may be responsive to adding garbage collection key data entries to the set of key data entries. The system may further include means for initializing an incremental key scheme, where a prior log subset of the key data entries is in the key data store at initialization, and means for adding, responsive to at least one storage operation executed after initialization, at least one new key data entry in the active generation subset. The at least one parameter value of the new key data entry may include at least one precondition value and at least one postcondition value, and calculating the current storage system parameter may include calculating a difference between the at least one precondition value and the at least one postcondition value. The various embodiments advantageously apply the teachings of data storage systems to improve the functionality of such computer systems. The various embodiments include operations and data structures to overcome or at least reduce issues in the previous storage systems discussed above and, accordingly, are more reliable, efficient, and scalable than other computer data storage architectures for some applications. That is, the various embodiments disclosed herein include hardware and/or software with functionality to improve the reliability and efficiency of storage system parameter calculation and reporting for automated data management decision-making. Accordingly, the embodiments disclosed herein provide various improvements to storage systems.

It should be understood, however, that the above list of features is not all-inclusive and many additional features and advantages, such as but not limited to those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 1A is a diagram illustrating an example key data store.

FIG. 1B is a diagram of an example object key naming structure.

FIG. 1C is a diagram showing an example ordered set of object key entries.

FIG. 1D is a diagram showing an example log entry for managing storage properties.

FIG. 1E is a diagram showing an example set of log entries for example storage operations.

DETAILED DESCRIPTION

Figure 2:
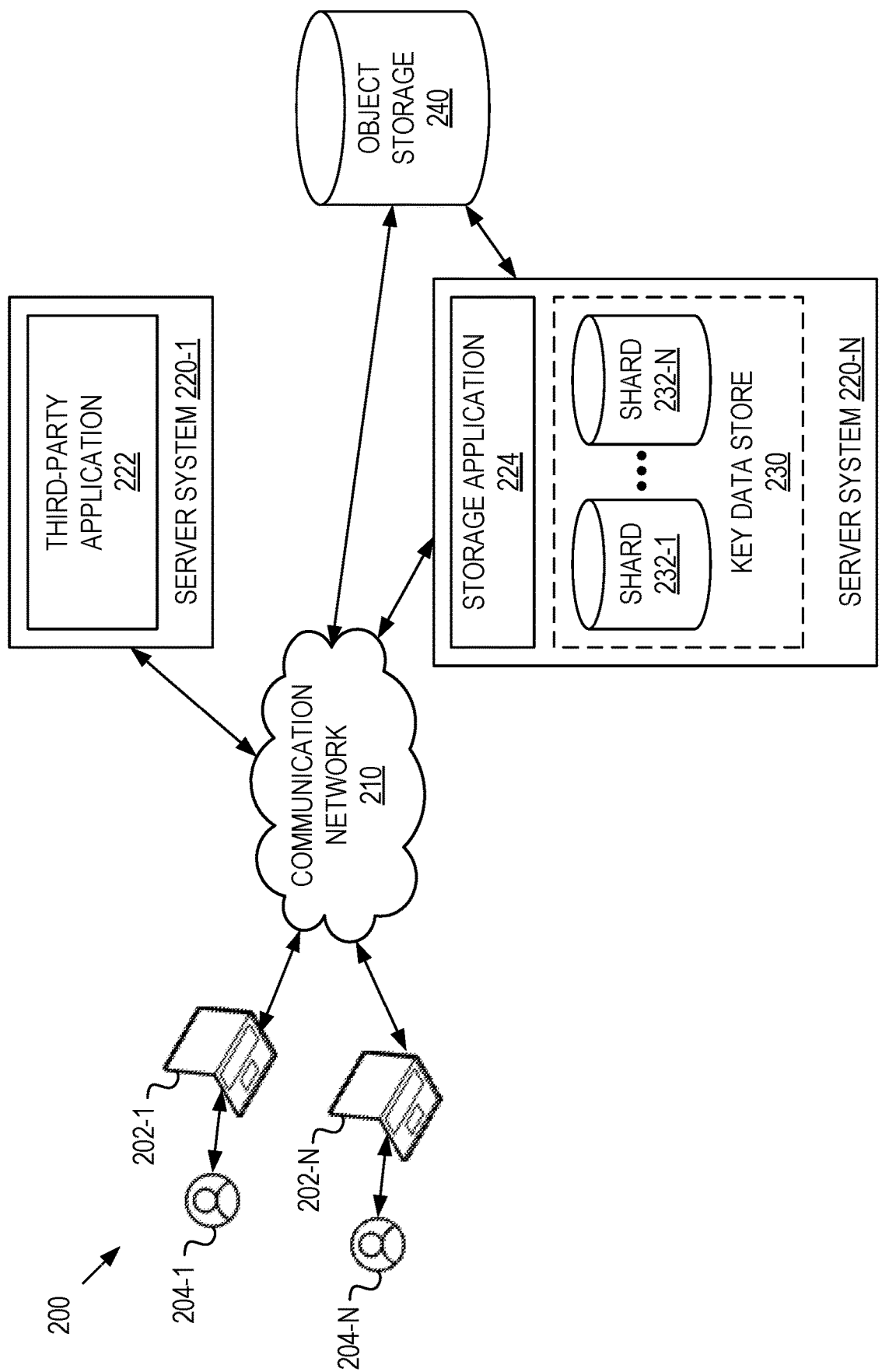
FIG. 2 is a block diagram of an example distributed storage system.

The present disclosure describes a novel storage property logging and storage system parameter determination technology, which may include methods, systems, apparatuses, computer program products, and other aspects, that utilizes a key data store (e.g., database, key-value store (KVS), etc.). The technology is advantageously scalable and efficient for improving distributed data storage system operations.

As a non-limiting overview, the technology can store storage properties with precondition and postcondition values in the key data store in a novel, ordered way that lowers overhead when processing storage operations (e.g., write requests) and determining storage system properties. The technology can include generation management within entries in the key-value data store to support log initialization and parameter calculation across system changes and events. The key data store supports a plurality of storage operations, such as but not limited to, put, get, delete, list, etc., and stores entries representing various data manipulation operations performed on objects, such as standard data manipulation operations (e.g., read, write, delete, modify, etc.). In some embodiments, the key data store may be sharded or distributed.

FIG. 1A is a diagram illustrating an example key data store 102, which comprises a plurality of shards S1 . . . SN. While two shards S1 and SN are shown, it should be understood that any suitable number of shards may be included. Each shard stores an ordered subset of object key entries. For example, shard S1 is shown as storing the subset of object key entries 106-1 (e.g., keys A-G) and shard SN is shown as storing the subset of object key entries 106-N (e.g., keys H-N). The subsets 106-1 through 106-N comprise the ordered set of object key entries 104.

Further, as shown in FIG. 1A, each key (e.g., A . . . N, etc.) can correspond to a data instance (e.g., $D_A$ . . . $D_N$). The data instance may comprise a pointer to a location where the actual object data is stored (e.g., in a separate database, on a physical drive, etc.), or other suitable data values. Each key may correspond to a particular object. Further, various subsets of object key entries may correspond to the same object at different points in time. In such a configuration, an ordered set of object key entries can be stored across shards that can be efficiently searched. Further, storage of the actual data may be performed in accordance with various considerations such as data location, availability, and cost.

In some embodiments, key entries 106-1, 106-N may include a log set of entries that define a log that may be traversed to determine the state of one or more data objects and their properties and/or determine one or more data storage parameters. The log may include a set of key entries corresponding to various storage operations that impact a selected property or properties. For example, each data instance (e.g., $D_A$ . . . $D_N$) may include precondition and postcondition values for one or more properties from which change values for the properties may be determined. In some embodiments, key data store 102 may include a plurality of concurrent logs for different properties and/or log entries interleaved with other key entries. Key data store 102 may also support multiple generations or groupings of entries over time. A generation of entries may include all entries between time points or events that designate the beginning and/or end of a generation.

In some embodiments, a key (also referred to as an object key) may be generated using an object key naming structure. FIG. 1B is a diagram of an example object key naming structure 120. As shown, a key may comprise a combination of a plurality of key components, such as, but not limited to, an object identifier and an inverse time value. More particularly, as shown, example components include a prefix 122, an object ID 124, a suffix 126, and a type 128, although it should be understood that other dimensions are possible and contemplated, and could vary based on implementation.

The prefix 122 may comprise an identifier for identifying a group of object key entries from the ordered set of object key entries that are logically related. For example, the prefix may include a domain identifier, a bucket identifier, a client identifier, or any suitable combination thereof. In this way, a given client's object keys can be grouped together. Any suitable number of prefixes may be included in an object key.

The object identifier (ID) 124 may comprise a unique identifier for the object to which the key corresponds, such as an object name. An example object identifier may comprise a unique character string (e.g., a file identifier, a file name, etc.) that is auto-generated and/or user-defined, and used for storing the object or file in an object storage, although other suitable data constructs that can uniquely identify objects are also encompassed.

The suffix 126 may comprise a ticket value for ordering different object keys associated with a particular object. The ticket value (also simply called ticket in some embodiments) may be an inverse timestamp. As discussed further herein, an inverse timestamp is calculated by determining the difference between an operation timestamp associated with the object key (e.g., local timestamp) and a reference timestamp value). As time passes, the value of the inverse timestamp generally decreases. As such, two sequential operations associated with the same object are recorded in the key data store in inverse order, with the most-recent operation being represented first (ahead of the less recent operation).

Additional suffix(es) may be appended, such as, but not limited to, an operation type, such as type 128, and/or a generation marker. The type 128 may comprise an identifier of the type of object storage operation that is represented by the object key. In some embodiments, a given operation may be denoted by a corresponding value, such as, but not limited to, unique character or character string, and the type 128 may include that value. Example object storage operations include read, write, delete, update, etc. As a further example, write and update operations may be represented by a given identifier (e.g., "W"), a delete operation may be represented a given identifier (e.g., "K"), etc., and so forth. While in some example embodiments, write and update operations may be recorded as the same type of operation, in further embodiments they may be differentiated.

FIG. 1C is a diagram showing an example ordered set of object key entries 130. As shown, the set 130 includes two keys 132-1 and 132-2 representing two sequential write operations. In this example, key 132-1 is based on an operation timestamp of 20 milliseconds (ms), the key 132-2 is based on an operation timestamp of 10 ms, and the ticketing technology uses an example reference timestamp of 100 ms. It should be understood that the timestamp values used are provided by way of example to make the examples provided herein clear, and any suitable timestamps may apply, such as a POSIX timestamp, a 1900 date system timestamp, derivations there, and/or any other suitable convention for tracking time. Further, as a matter-of-course, the value of the reference timestamp is often chosen to have a value that is larger than the expected service life of the key data store.

Using the reference timestamp, the ticketing technology determines an inverse timestamp for each of the operations. As the operation timestamps increase with the passage of time, the computed inverse timestamps decrease for the operations executed over time. For instance, an inverse timestamp for a given operation is calculated by determining the difference between the operation timestamp and the reference timestamp). In particular, continuing the above example, for key 132-1, the inverse timestamp is 80 (100−20=80), and for write operation 132-2, the inverse timestamp is 90 (100−10=90).

By ordering the entries in the key data store (and the operations embodied thereby) relating to the same data object using at least the inverse timestamps, subsequent operations relating to that data object are arranged in entries in the ordered key data store with the most-recent operation being represented first. For instance, as shown in FIG. 1C, key 132-2, which represents an operation having an inverse timestamp of 90, is older than key 132-1, which represents a more recent operation having a timestamp of 80. As a result, an entry comprising key 132-1 is ordered ahead of an entry comprising key 132-2 in the ordered set 130 because key 132-1's inverse timestamp is lower (80 versus 90).

By way of further example, during a subsequent query, retrieval of the most-recent entry from the ordered set of object key entries (e.g., in this example, the entry comprising key 132-1) can be performed efficiently (e.g., by the key data store controller 320, see FIG. 3) because retrieval of the first entry in the ordered set for a given object (e.g., OBJ_NAME) does not require iteration through entries associated with that object. Rather, by way of illustration, such a retrieval may consume equivalent computational resources as that of an exact lookup of a single key for that object.

Versioning of an object includes the tracking and preservation of more than one version of the object as the object changes over time, and allows for the archival of the different versions of the object as they occur over time (e.g., due to modifications made over time to the object), retrieval of a prior version of the object, and/or recovery from unintended overwrites and/or deletions made to the object.

FIG. 1D is a diagram showing an example log entry 140 for managing storage properties. Log entry 140 may be stored as a key entry in a key data store as described with regard to FIGS. 1A-1C. Log entry 140 may include a key value 142 followed by "from" precondition field 144 and "to" postcondition field 146 that designate a precondition value ("from") and a postcondition value ("to") in the data instance portion of the key data entry. For example, the key value may be in the form described with regard to FIG. 1B. Precondition field 144 and postcondition field 146 may each include a property identifier ("properties") and property value ("precondition" and "postcondition" respectively). In some embodiments, precondition field 144 and postcondition field 146 may each include a plurality of property identifier-value pairs for a plurality of data properties and change values associated with the data storage operation and object designated in key value 142. For example, property values for one or more of storage capacity, object size, read count, write count, or other storage properties may be included in log entry 140.

FIG. 1E is a diagram showing an example set of log entries 150 for example storage operations. As shown, the set 150 includes two key entries 152-1 and 152-2 representing two subsequent storage operations, write operations to the same data object ("OBJ_NAME"). Key entries 152-1 and 152-2 may also include generation marker 154-1 ("g2"), representing a current generation, and generation marker 154-2 ("g1"), representing an earlier generation. Generation markers 154-1, 154-2 may be appended to and part of the key values for key entries 152-1, 152-2 as described above with regard to FIG. 1B. Generation markers could also be included in the data value. Old keys or data which does not contain a generation marker could be considered as "generation 1" or "generation 0" in the algorithms described later in this text.

The corresponding data instances include precondition fields 156-1, 156-2 and postcondition fields 158-1, 158-2. In the example shown, a write operation occurred at timestamp 20 ms, resulting in an inverse timestamp of 80 ms. The precondition included no properties ("None") and a property value of 0 bytes. The postcondition resulting from the write operation is a data object size ("data") property with a property value of 100 kB. A second write operation occurred at timestamp 40 ms, resulting in an inverse timestamp of 60 ms. The second write operation includes a complete overwrite of the prior object and starts with a precondition value that includes no properties ("None") and a property value of 0 bytes. The post condition property is data object size ("data") but has a new postcondition value of 250 kB representing a change in the data object size resulting from the write. From the precondition value and postcondition value, a change value of 150 kB may be calculated as the difference between the postcondition values of the two operations.

The key data store may be implemented in a distributed environment, such as the distributed storage system 200 depicted in FIG. 2. As shown, the system 200 can include client systems (e.g., client systems 202-1 and 202-N), server systems (e.g., server systems 220-1 and 220-N), a key data store 230, and an object storage 240. These components 202, 220, 230, and/or 240 may be interconnected via a communication network 210. For simplicity in some cases, depending on context, the client systems 202-1 and 202-N may also be referred to herein individually or collectively as client system 202 or client 202, and the server systems 220-1 and 220-N may be referred to herein individually or collectively as server system 220 or server 220. Object storage 240 may be configured in one or more storage nodes configured to execute storage operations against one or more physical storage devices, such as hard disk drives and/or solid state drives.

The communication network 210 may include any number of private and public computer networks. The communication network 210 include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via the network 210 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (short message service (SMS), multimedia message service (MMS), extensible message service (XMS), internet message access protocol (IMAP), simple mail transfer protocol (SMTP), post office protocol (POP), web distributed authoring and versioning (WebDAV), etc.), or other suitable protocols.

A client system may comprise an electronic computing device, such as a personal computer (PC), a laptop, a smartphone, a tablet, a mobile phone, a wearable electronic device, server, server appliance, or any other electronic device or computing system capable of communication with the communication network 210. The client system 202 may store one or more client applications in non-transitory memory. A client application may be executable by a computer processor of the client system 202. In some example embodiments, a client application includes one or more applications such as, but not limited to, data storage applications, search applications, communication applications, productivity applications, game applications, word processing applications, or any other useful applications. A client application may include a web browser and/or code executable thereby in some cases. In some embodiments, a client system 202 may include an application for creating, modifying, and deleting objects, which may be stored in the object storage 240. For instance, the application may be specifically customized for communication with the third-party application 222 and/or storage application 224, such as an application adapted to configure and/or utilize programming interfaces of the storage application 224. In some embodiments, the third-party application(s) 222 hosted by the server system 220-1 may embody a client of the storage application 224, as it may access the functions of the storage application 224 using various programmatic interfaces surfaced thereby (e.g., to create, store, retrieve, delete, etc., objects stored in the object storage).

The client systems 202 and/or server systems 220 may send/receive requests and/or send/receive responses, such as but not limited to HTTP(S) requests/responses, to/from one another. A client system 202 may present information, such as visual, audio, tactile, and/or other information via output devices, such as displays, audio reproduction devices, vibration mechanism, etc., based on information generated by client system 202 and/or received from a server system 220.

Users may interact with various client systems 202 to provide input and receive information. For instance, as illustrated, users 204-1 and 204-N may interact with client systems 202-1 and 202-N by utilizing the operating system and/or various applications executing on the client systems 202-1 and 202-N.

In some embodiments, a client application (e.g., a client application executing on a client system 202, the third-party application 222, etc.) may send a request (also referred to as an object storage request) to the server system 220 to store, update, delete, or retrieve a particular file stored at the server system 220-N through the communication network 210. For example, a user 204 may update a document using a word processing application and may save the updated version to the server system 220-N, in which case the word processing application transmit a request to the storage application 224 to store the updates.

The object storage request may include information describing the object being updated, such as a file name, the data comprising the updates, a client identifier, an operation type, etc., and the storage application 224 may use that information to record the updates, as described herein. In another example, a client application (e.g., an application executing on a client system 202, the third-party application 222, etc.) may request an object or portion thereof, a list of objects matching certain criteria, etc., in which case the request may include corresponding information (e.g., an object identifier, search criteria (e.g., time/date, keywords, etc.), and receive an object list or the object itself from the storage application 224. Numerous other use cases are also applicable and contemplated.

As shown in FIG. 2, the server system 220-N may include a storage application 224 and may be coupled to and/or include a key data store 230. The storage application 224 may include components that perform various tasks, as discussed with reference to at least FIG. 3. The storage applications 224, and/or its components, may be coupled for communication to one another and other components of the system, such as the key data store 230, the object storage 240, an application executing on a client system 202, the third-party application 222, etc.

The storage application 224 may provide an object storage service, manage data storage using the key data store 230 and the object storage 240 (e.g., store, retrieve, and/or other manipulate data in the key data store 230, retrieve data objects from the object storage 240, etc.), process requests received from various entities (e.g., client systems 202, server systems 220, local application, etc.), provide for lock-free concurrency, perform garbage collection, and perform other acts, as discussed further herein. The storage application 224 may include various interfaces, such as software and/or hardware interfaces (e.g., application programming interface(s) (API(s)), that may be accessed (e.g., locally, remotely, etc.) by components of the system 200, such as various client applications, the third-party application 222, etc.

In some embodiments, the storage application 224 may be a distributed application that is implemented in two or more computing systems. In some embodiments, the object storage 240 may comprise a plurality of storage devices, servers, software applications, and other components, such as but not limited to any suitable enterprise data grade storage hardware and software. Similarly, while FIG. 2 shows the key data store 230 as residing on a single server, it should be understood that the key data store 230 may be distributed across two or more computing systems, such as server systems 220. In some embodiments, the storage application 224 may be a local application receiving local and/or remote storage requests from other clients (e.g., local applications, remote applications, etc.).

The key data store 230 may comprise a database that stores an ordered set of object key entries, as discussed in further detail elsewhere herein. In some embodiments, the key data store 230 may comprise a horizontally partitioned database having two or more shards 232-1 . . . 232-N, although other suitable database configurations are also possible and contemplated. As horizontal partitioning is a database design principle whereby rows of a database table are held separately, rather than being split into columns (which is what normalization and vertical partitioning do, to differing extents), each partition can form part of a shard, which may in turn be located on a separate database server or physical location. Thus, depending on the configuration, database shards may be implemented on different physical storage devices, as virtual partitions on the same physical storage device, or as any combination thereof.

The server system 220-N may be coupled to and/or include an object storage 240. The object storage 240 comprises one or more data stores for storing data objects. The object store 240 may be implemented across a plurality of physical storage devices. In some example embodiments, the plurality of physical storage devices may be located at disparate locations. For example, the one or more data stores may be distributed across a number of storage nodes, such as rack mounted storage nodes, including a plurality of physical storage devices and interconnected through controller nodes in different locations. Objects stored in the object storage 240 may be referenced by object key entries stored in the key data store 230. In some example embodiments, multiple copies of a given object or portions thereof (e.g., erasure-encoded copies) can be stored at different physical storage devices to protect against data loss through system failure or to have the object quickly accessible from different geographic locations.

The key data store 230 and/or the object storage 240 may be included in the server system 220-N or in another computing system and/or storage system distinct from but coupled to or accessible by the server system 220-N. The key data store 230 and/or the object storage 240 include one or more non-transitory computer-readable mediums (e.g., such as those discussed with reference to the memor(ies) 304 in FIG. 3) for storing the data. In some implementations, the key data store 230 and/or the object storage 240 may be incorporated with the memor(ies) 304 or may be distinct therefrom. In some implementations, key data store 230 and/or the object storage 240 may store data associated with a database management system (DBMS), such as one comprised by and/or controlled by the storage application 224 (e.g., the key data store controller 320, the storage service 322, etc., see FIG. 3) and/or other components of the system 200. In some instances, the DBMS may store data in multi-dimensional tables comprised of rows and columns, and manipulate, e.g., insert, query, update and/or delete, rows of data using programmatic operations, although other suitable DBMS configurations are also applicable.

It should be understood that the system 200 illustrated in FIG. 2 is representative of an example system, and that a variety of different system environments and configurations are contemplated and are within the scope of the present disclosure. For instance, in some further embodiments, various functionality may be moved between servers, from a server to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the system 200 may be integrated into a single computing device or system or additional computing devices or systems, etc.

Figure 3:
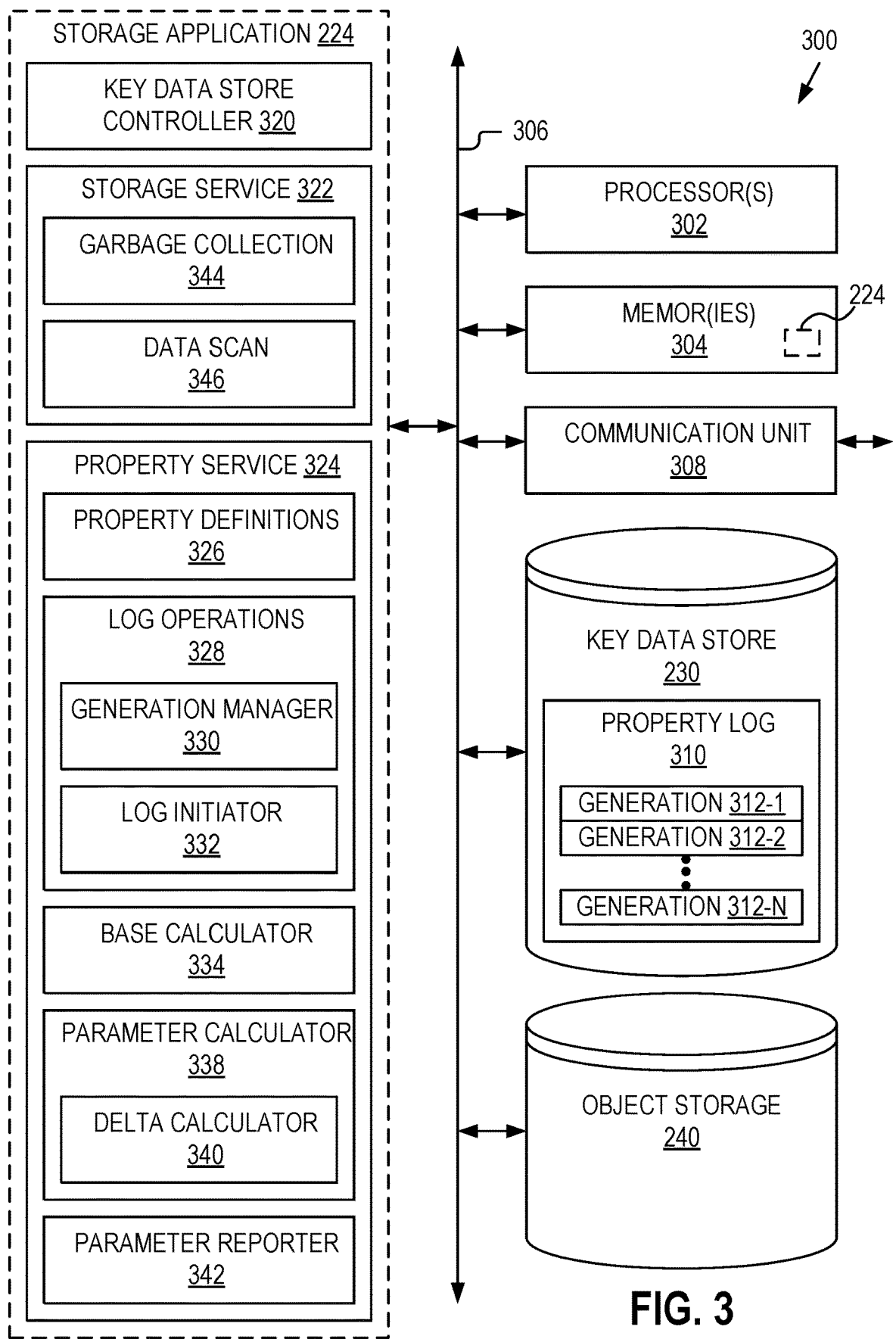
FIG. 3 is a block diagram of an example computing system.

FIG. 3 is a block diagram of an example computing system 300. In some embodiments, computing system 300 may represent a server instance or collection of instances, such as server system 220-N. In some embodiments, computing system 300 may reflect other computing systems, such as a client system 202, a dedicated storage system, etc. Computing system 300 may comprise and/or be coupled to one or more processors 302, one or more memories 304, one or more communication units 308, a key data store 230, and an object storage 240. Computing system 300 further includes an instance of storage application 224. The components of computing system 300 can be communicatively coupled by a bus 306. In some embodiments, key data store 230 and/or object storage 240 may be implemented in a separate computing system and may be coupled to computing system 300 via communication unit 308. In such embodiments, storage application 224, or aspects thereof, may be implemented in the separate computing system (e.g., as a distributed or local application, etc.)

As shown in FIG. 3, storage application 224 includes a key data store controller 320, storage service 322, and property service 324, although it should be understood that the depicted storage application 224 architecture is provided by way of illustration, and that storage application 224 may include other components and/or include other component hierarchies, and/or that the foregoing components and/or their acts and/or functionality may be combined or segmented into further components, etc.

Storage application 224, and/or its sub-components, such as, but not limited to, key data store controller 320, storage service 322, and/or property service 324 may be implemented in hardware and/or software. For instance, storage application 224, and/or one or more of its sub-components, may include hardware and/or software logic executable by the computing system 300. In some embodiments, storage application 224, and/or one or more of its sub-components, may comprise sets of instructions executable by processor(s) 302 to provide their functionality. In some embodiments, storage application 224, and/or one or more of its sub-components, are stored in memor(ies) 304 of computing system 300 and are accessible and executable by processor(s) 302 to provide their functionality. In any of the foregoing implementations, storage application 224, and/or one or more of its sub-components, may be adapted for cooperation and communication with processor(s) 302 and other components of computing system 300.

In further implementations, storage application 224, and/or one or more of its sub-components, may include specially configured software stored in memor(ies) 304 and executable by processor(s) 302 so as to configure processor(s) 302. In some embodiments, storage application 224, and/or one or more of its sub-components, may include logic gates, switches, application specific integrated circuitry (ASIC), a programmable logic controller, an embedded microcontroller, and/or other suitable hardware, etc. In further embodiments, storage application 224, and/or one or more of its sub-components, may include both hardware and software aspects. Numerous further variations are also possible and contemplated.

It should be appreciated that computing system 300 may represent a single computing system, a plurality of computing systems connected over a wide geographic area, a server cluster, or other suitable computing configurations. Thus, while the structure, acts, and functionality of computing system 300 may be described in the singular for clarity, it should be understood that the description is applicable to and includes more simple or complex computing infrastructure.

Key data store controller 320 comprises logic executable to manage the key data store 230. For instance, the key data store controller 320 maintains the integrity of the ordered set of object key entries, generates new object keys, stores new entries, retrieves existing entries, and manages concurrency, etc.

Key data store controller 320 can maintain the entries stored in the key data store 230 as an ordered set of object key entries. As discussed elsewhere herein, such as with reference to FIGS. 1A-1E, the ordered set of object key entries may first group the entries using at least an object identifier component of the key, and then group the entries corresponding to each name in order of most-recent to least recent using an inverse time component of each of the keys. Additionally, entries may further be grouped in the ordered set of object key entries using further key components, such as one or more additional prefixes preceding the object name/identifier. One or more suffixes following the inverse timestamp component may be used to determine characteristics about the operation represented by the entry and/or further distinguish the key from other keys, for instance based on the application or device that executed the operation (e.g., client ID), the type of operation that was performed, and so forth.

In some example embodiments, keys may comprise alphanumeric character strings that include letters, numbers, and/or symbols (character symbols, punctuation, mathematical symbols, etc.), in which case the ordered set of object key entries may be sorted alphanumerically. For instance, referring to FIG. 1C, key 132-1 is first because the inverse timestamp of 80 comprising a portion of the character string of that key is lower than the inverse timestamp of 90 comprising a portion of the character string of the subsequent key of entry 132-2. However, it should be understood that configurations that reverse the sorting order and the inverse timestamps to achieve an objective equivalent to that as the ordered set of object key entries are encompassed hereby. Further, the keys may comprise other suitable constructs (e.g., encoded, compressed, etc.) that can be sorted in an analogous manner.

Key data store controller 320 stores entries in the key data store 230 reflecting data manipulation or storage operations performed on objects (e.g., read, modify, write, etc.). In some embodiments, storage operations performed on object may include or trigger changes in one or more object properties, such as object size, and the entries in key data store 230 may include storage property values, including precondition values and postcondition values. Entries storing property change values may define a log set of key entries for one or more properties, objects, or other logical grouping of log entries. Entries may be stored responsive to object storage requests received by the storage service 322, such as but not limited to, put, get, delete, list, etc. Storage service 322 may be coupled to key data store controller 320 to instruct the key data store controller 320 to record the data storage operations. For example and not limitation, in a software embodiment, storage service 322 can call corresponding methods of key data store controller 320 configured to perform the various functions and acts described herein. An instruction received form storage service 322 may comprise a new key entry request that includes components for generating the key, and in some embodiments, data corresponding to the key and/or properties related to the storage operation and/or data object.

By way of example, when recording a write, update, delete, etc., operation, the key entry request received from storage service 322 may include key-related data for generating the key, and a corresponding data instance (e.g., data value) for storage in association with the key. Responsive to receiving the storage instruction from storage service 322, key data store controller 320 computes an inverse timestamp using the key-related data, generates the key using the inverse timestamp, the object identifier, etc. (e.g., a prefix, an operation type, etc.), and stores a new entry comprising the generated key and the data instance in order of recency, as described elsewhere herein. In some embodiments, the data value may include precondition and postcondition values for one or more storage properties.

Continuing the foregoing example, key data store controller 320 can determine the inverse timestamp using an operation timestamp and a reference timestamp by determining a difference between the operation timestamp and the reference timestamp (e.g., subtracting the operation timestamp from the reference timestamp), as discussed elsewhere herein. The operation timestamp may be included in the instruction data or may be determined by key data store controller 320 (e.g., using a clock of the local system, issuing a call to the operating system, etc.). For instance, the object storage request received and processed by storage service 322 includes a timestamp determined by the requesting computing system upon which the request was initiated (e.g., a client system 202, server system 220-1, etc.). In this case, the local operation timestamp may reflect the point in time in which the object storage operation was initiated (e.g., based on a clock of that system). In another example, key data store controller 320 assigns a timestamp to a requested object storage request based on the clock at server system 220. Other suitable variations may also apply.

In the foregoing example, the new entry is situated first for that object (relative to other existing entries) in the ordered set of object key entries since it is the most recent based on the inverse timestamp. However, as further operations are performed on the object, as discussed elsewhere herein, corresponding further entries are added to key data store 230 and the foregoing new entry becomes less recent. This advantageously allows for scalable and flexible versioning of a data object.

An operation type component included in the key generated by key data store controller 320 may reflect the operation performed on the object, and may be used to record the lifecycle of the object over time (when it was initially created, modified, deleted, etc.).

As another example, when performing a read operation (e.g., responsive to receipt of a list request), the instruction data received from storage service 322 may include key-related search terms that are used for querying key data store 230. For example, the search term(s) may comprise an object identifier or portion thereof, and key data store controller 320 may query the ordered set of object key entries in key data store 230 based on it and return a corresponding result set. Additional or alternative search term(s) may include, but are not limited to, data describing a domain, bucket, timestamp, operation type, etc., and key data store controller 320 may query the ordered set of object key entries in key data store 230 based on them and return a corresponding result set.

In some cases, the result set may be ordered in inverse order beginning with the most-recent entry first and the oldest entry last, which mirrors the order in the ordered set of object key entries of key data store 230, although the result set could be ordered in other ways depending on implementation.

In some embodiments, further key components may be included in the instruction from storage service 322 so the result set may be refined (e.g., limited to a certain client and/or operation type, etc.). In some cases, the most-recent entry for a particular object reflecting the most-recent data manipulation operation may be requested, in which case the result set may include a single result. Other variations are also possible and contemplated.

Storage service 322 comprises computer logic executable to process object storage requests. Storage service 322 may receive requests from local applications and/or remote applications. An application that sends storage requests to storage application 224 is referred to herein as a client application. Storage service 322 can process the requests and transmit corresponding responses, which may include confirmation data confirming a successful execution of a storage operation, response data reflect results of a query-based request, and/or error information reflecting any errors that were encountered, etc. In further embodiments, the functionality of storage service 322 may be included in key data store controller 320, in which case key data store controller 320 may receive and process the object storage requests.

In some embodiments, storage service 322 may include a request handler that receives and parses object storage requests from client applications, such as a client application operating on various client systems 202, server systems 220, etc. As discussed elsewhere herein, the request may include any data necessary for executing the request, such as data for generating a new object key entry (e.g., key components, data value (e.g., an address, such as a link, pointer, reference, unique identifier, etc.)), data for querying entries based on the key (e.g., search terms, key components, etc.), object data to be stored in the object storage 240 (e.g., comprising a new object, modification to the object, object metadata describing the object, updates, etc.), one or more property types and property values, including precondition and postcondition values, etc. Storage service 322 may parse the data from the request and process it accordingly.

For example, responsive to receiving a request, the storage service may implement the requested object storage operations in object storage 240. For example, storage service 322 may read, write, update, and/or otherwise manipulate objects in object storage 240 based on parameters of the request. For instance, if the request is a write request that stores a new object to object storage 240, storage service 322 may write the new object to object storage 240.

Storage service 322 may interact with the key data store controller 320 to store and retrieve data from key data store 230. To do so, in some cases, storage service 322 can issue various instructions to key data store controller 320, such as but not limited to instructions comprising put, get, delete, list, request, etc.

In some embodiments, in conjunction with the implementation of an object storage operation, storage service 322 may request that key data store controller 320 store a new entry reflecting the operation responsive to receiving the object storage request from a client. As discussed elsewhere herein, each ticket/entry stored in key data store 230 may be associated with an object storage operation performed at a particular point in time in association with an object in object storage 240.

By way of further example and not limitation, storage service 322 may request that key data store controller 320 store an entry in key data store 320 that corresponds with an operation being performed on a corresponding object in object storage 240. For instance, in association with writing a new object to object storage 240, storage service 322 may request that key data store controller 320 store a new entry comprising a corresponding object key (that includes the object identifier, inverse timestamp, etc.) and object reference in key data store 230. Alternatively, when an object is deleted from object storage 240, storage service 322 can request that key data store controller 320 store an entry in key data store 230 reflecting deletion of that object, as discussed elsewhere herein. In association with that instruction, storage service 322 may or may not delete some or all instances of the object data from object storage 240 depending on the data retention protocol.

In some embodiments, storage service 322 may manage garbage collection 344. Garbage collection may include any process for reclaiming memory or storage allocations related to data objects no longer active in the DSS. For example, storage service 322 may initiate garbage collection 344 in response to data objects being deleted or moved, at regular intervals or activity thresholds, and/or in response to input or trigger conditions from other functions, such as property service 324. Garbage collection 344 may enable object storage 240 and/or key data store 230 to reuse storage or memory space for active and future data objects, as well as optimizing the storage locations of data objects and related data units, such as by defragmenting. After garbage collection is run, logical and/or physical data units may be returned to available storage capacity and may impact data properties and storage system parameters.

In some embodiments, storage service 322 may manage data scans 346. Data scans may include any process for reading or indexing a set of data objects within object storage 240 to determine their number, location, properties, state, or other information. For example, a data scan may be performed periodically for the purpose of updating data properties and/or identifying data objects or data units for garbage collection. Data scans 346 may be configured for partial scans, such as data scans looking at a subset of object storage 240 (e.g., bucket, user, redundancy group, etc.), and/or full scans that look at an entire object storage system. Data scans may also be configurable for what properties they collect and report.

In some embodiments, the storage service may instruct key data store controller 320 to query key data store 230 for one or more entries matching query criteria included in the request. For instance, responsive to receiving the request, key data store controller 320 may query the operations associated with a particular object by querying key data store 230 for the ordered keys associated with the object (e.g., using the object identifier, etc.), and return a result set to storage service 322 for provision to the requester. Storage service 322 may be coupled to key data store controller 320, and interact with key data store controller 320 to store and retrieve data from key data store 230.

Property service 324 comprises logic executable to manage a property log 310 in key data store 230. For instance, property service 324 manages the properties monitored in property log 310, maintains the integrity of the log set of key data entries, generates or defines property fields for a given storage operation, stores new entries, retrieves existing entries, calculates storage parameters from the log, reports storage parameters to storage management functions, and manages log operations, such as cleanup, etc. Property service 324 may identify and manage multiple generations of key data entries in property log 310, such as distinguishing an active generation of log entries from a base or prior set of log entries. For example, generation 312-1 may be a base generation of key data entries that was present in property log 310 prior to an initialization or other event and generation 312-2 may be an active generation of key data entries distinguished by a generation marker. In some embodiments, any number of generations 312-N may be identified and managed based on generation markers inserted into each log entry, such as by appending to the key value.

Property service 324 may be coupled to key data store controller 320, and interact with key data store controller 320 to store and retrieve data from property log 310 in key data store 230. Property service 324 may be coupled to storage service 322, and interact with storage service 322 to determine properties and property values corresponding to each storage operation processed by storage service 322. In some embodiments, property service 324 may include property definitions 326, log operations 328, base calculator 334, parameter calculator 338, and parameter reporter 342.

Property definitions 326 may include one or more data structures for defining storage properties to be stored in property log 310. For example, property definitions 326 may include a definition file for data object size, defining a property identifier (e.g. "data"), property value type (e.g. integer), and the metadata field(s) and/or related calculations from which the value may be determined for any given storage operation. In some embodiments, a single property may be defined for property log 310, while others may include a plurality of property definitions to track a plurality of storage properties in one or more logs. Other storage properties may include, but are not limited to, total storage capacity, write count, read count, error/retry count, and other performance parameters for the data object and/or related storage systems or applications calling the data object.

Log operations 328 manage the maintenance and integrity of log entries in property log 310. For example, log operations 328 may include a plurality of functions or key data operations for adding and removing log entries in response to storage operations and/or related log maintenance operations. In some embodiments, log operations 328 may include basic log operations, like log, cleanup, removal, and logical delete functions. To assist with the use of generation markers, log operations 328 may include generation manager 330 and garbage tracker 332. Other log maintenance functions may be included in some embodiments.

A log operation may write or store key data entries including one or more precondition fields and postcondition fields in property log 310. For example, a write operation "W" for a data object "A" at a first time value "20" may result in a key "A_80_W", 80 being an inverse time value as described above. A subsequent write operation at a second time value "25" for this object will for example result in a corresponding key "A_75_W". A subsequent delete operation "K" at a third time value "30" will for example result in a key "A_70_K". The key data entries in property log 310 may be added in an ordered way based on these keys to result in the most recent key entry always appearing first, thereby allowing for an efficient retrieval of the most up to date state/operation of the data object in the DSS.

An exemplary write operation, and the corresponding log-based key scheme will now be described. In the embodiment described below, property "total_storage_capacity" is considered to be 0 (when starting with an empty system) or the correct value for the current system. Such a write operation, could for example be made available through an API, similar such as an Amazon Simple Storage Service (S3) API PUT operation handled by storage service 322.

When now writing 100 kB data object "A" at time "20" to the DSS comprising as contents "Data", the following entry will be added to the log: A_80_W; from: None.<0B>; to: Data.<100 kB>. Thus, a first log key data entry operation for a given data object may generate a null or default start value for the relevant property, such as 0B for an empty (or previously non-existent) object.

For example, upon addition of this entry to the log, a process can immediately be triggered (as described below with regard to parameter calculator 338) to adjust the "total storage capacity" by means of both the precondition and the post condition property for the storage capacity of object A. As described, as there was no pre-existing entry in the log for object A, the precondition property was set to 0B. The postcondition property was set to 100 kB, equaling the size of the written data. In this way the "total storage capacity" may be incremented by the change value (post condition property−precondition property=100 kB). The combination of the key scheme and both the precondition and postcondition properties may ensure that the "total storage capacity" can be incremented correctly, and only once for each operation.

As further example, a subsequent write operation may include an overwrite of object A. At a subsequent time "40" a 250 kB data object "A" may be written to the DSS, comprising as contents "Data". The following entry will be added to the log: A_60_W; from None.<0B>, to: Data.<250 kB>. Thus, a second log key data entry operation for a prior data object may also generate a null or default start value for the relevant property, such as 0B to represent a complete overwrite of the data object. If, on the other hand, the subsequent operation only modified the original object A, the first log key data entry would be modified to: A_80_W; from: None.<0B>; to: Data.<250 kB>. In either case, the capacity value may be increased from 100 kB for the original object to 250 kB for the subsequent operation.

Cleanup and removal operations may handle delete and similar data change storage operations that mark a data object for garbage collection. For example, a cleanup operation may be embodied in a cleanup key data entry operation executed by property service 324 to remove or modify prior log entries for the target data object that may no longer be necessary. A removal operation may be embodied in a removal key data entry operation executed by property service 324 to update or generate an updated log entry that represents the change in the storage property responsive to the data change event.

To continue the example above, data object A may be deleted at time 40. Log operations 328 may trigger three related log operations. First, a log operation may add a key data entry to property log 310: A_60_K; from: None.<0B>, to:<deleteOP>. Note that delete operations may be treated as a new entry with a precondition parameter of None and value of 0B. Storage service 322 may immediately render the data object invisible to the user, but log operations 328 may not immediately modify related parameter calculations. Object A may be marked for garbage collection by storage service 322 and a cleanup operation may initiate an operation to wait for the garbage collection process to complete, free up the space occupied by object A, and remove any outdated log entries that result from the preceding operations. A total storage capacity calculation during this process may still result in the 100 kB of object A being treated as used until garbage collection completes.

In response to garbage collection for object A completing, a removal operation may execute a log operation that negates the prior write operation so it can be deleted from the key data entries. For example, a log operation of A_80_W; from: Data.<100 kB>; to: None.<0B> may remove the original A_80_W entry and correct subsequent total storage capacity calculations back to 0B. A reliable update of the total storage capacity may be assured by means of the log-based operations for the specific key scheme. By waiting for the cleanup of the original data object and responsively negating it with a log operation with appropriate precondition and postcondition values, the pointer to the data object may not be removed from the metadata key database before the related data object is removed from the backend DSS (e.g. object storage 240).

The foregoing process may protect against mishandling of multiple delete operations, which may occur in DSS. For example, two users may issue delete operations for data object A at times 40 and 41. As described above, the initial write would be logged at A_80_W and the first delete would be logged at A_60_K. The second delete would be logged as: A_59_K; from: None.<0B>, to:<deleteOP>. Storage service 322 rendering the data object invisible for users and marking object A for garbage collection is not impacted by multiple instances. The cleanup operation may similarly wait for garbage collection for the object to complete, which will only occur once, and the removal operation will only execute once in response. Thus, the single removal operation will only decrement the storage capacity once and accuracy of the property values is maintained. The end result may be total storage capacity of 0B and only the delete key data entries remaining in the key database.

In some embodiments, the foregoing process may also protect against multiple and conflicting write operations, such as write operations for the same object received from two different users. For example, the previously described write operation on object A at A_80_W may be followed by a second write from a different client at 30 ms and logged as: A_70_W; from: None.<0B>, to: NewData.<250 kB>. Upon processing the second write request, storage service 322 may identify the conflicting requests and resolve it in accordance with the conflict resolution policy of the DSS. Upon identifying which write request will be rejected, a garbage collection process may trigger cleanup and removal operations as described above. For example, upon entry of the key A_70_W to the metadata, the presence of older key A_80_W may be detected and identified for removal using cleanup and removal operations.

In some embodiments, a logical delete operation may provide an additional function to assist with the lag between logging a delete operation and waiting for garbage collection to trigger cleanup and removal. Logical delete operations may add an operation in response to delete and similar storage operations that inserts a logical delete flag or marker into the log entry for the prior write of the object. The logical delete flag may include a value appended to the postcondition value, precondition value, or otherwise inserted into the data portion of the log entry. For example, logical delete may read the prior write operation entry for the data object, such as A_80_W, and generate a logical delete key data entry that inserts a logical delete marker value, such as "|LD", in the postcondition value of the entry, resulting in: A_80_W; from: Data.<100 kB>; to: Data.<100 kB|LD>. Cleanup and removal operations may operate as described above in executing the cleanup key data entry operation and removal key data entry operation (e.g. A_80_W; from: Data.<100 kB|LD>; to: None.<0B>). Parameter calculator 338 may immediately adjust the relevant storage parameter(s) based on the logical delete marker without waiting for completion of cleanup and removal.

Generation manager 330 may include one or more functions that identify storage operations and related log entries as belonging to a particular generation and insert and/or update generation markers as log operations 328 writes log entries to property log 310. For example, generation manager 330 may identify a preexisting base of log entries and initialize an active generation of log entries moving forward. In some embodiments, the base subset of log entries may be assigned a generation marker and, in other embodiments, the lack of a generation marker may be treated as an identification of the base set of key value entries. For example, generation 312-1 may include the set of log entries that was present in property log 310 prior to initialization or some other event designating the start of the next generation, such as generation 312-2. This process of assigning a new generation marker to an active generation set of log entries may continue for any number of generations (e.g. thru generation 312-N).

In one example, a new incremental log-based scheme using the key value entries described above for tracking data properties may be implemented. Every new key value entry in property log 310 may be marked by a new generation marker that is different from the generation marker in the prior entries already present in the log. In some embodiments, a binary indicator may be used as the generation marker, such as one value that represents before initialization (base log set) and another value that represents after initialization (active log set). Any other suitable generation marker, such as a marker identifier (e.g. "g") and incremental generation marker value (e.g. 1, 2, 3, etc.) may be used for a generation marker. The generation marker could also be present in the data value. The absence of a generation marker could be considered as a generation 0 or generation 1.

For example, a generation marker "g2" may be used as the generation marker for any log-based key entry after the startup or initialization event, while "g1" may be present for all key entries already present before the startup of a final full scan run and use of the new log-based scheme allowing for incremental property updates. Thus, key "A_80_W_g1" may refer to a log entry that was already present before the initialization of the new incremental log-based key scheme. Key "A_90_W_g2 may refer to an entry added after startup of the new incremental log-based scheme.

In some embodiments, any number of sequential generation markers may be used. For example, a new generation marker may be generated for sequential operating periods over the life of one or more data stores. In an initial period, the DSS may have a first key data store configuration or log configuration, in a second sequential operating period the DSS may have a second key data store or log configuration and receive a new generation marker, and in a third sequential operating period the DSS may have a third key data store or log configuration and receive yet another new generation marker. This may continue for any number of generations where all prior generations may be included in a collective base generation relative to the new, active generation.

Log initiator 332 may include one or more functions for the initialization of a new log scheme for property service 324 and property log 310 and/or a new generation using generation manager 330. For example, when a new log-based scheme or new generation has been initiated by a system administrator or system configuration process, log initiator 332 may initiate a series of steps using storage service 322, base calculator 334, and parameter calculator 338. For example, log initiator 332 may define and start the active generation of property log 310; start a final run of a full scan of the relevant storage property or properties using data scan 346 without garbage collection 344 to generate a base parameter value; initiate a separate garbage collection run using garbage collection 344 to capture log entries in the active log set from the storage operations for removing data objects; and completing the initialization process to denote the active generation log set as current going forward (or until a next generation is to be initiated). Note that the full scan is typically started after log initiator 332 initiates the first (or new) active generation, so that all operations performed during the scan are captured in property log 310 in the active generation. Garbage collection may be suppressed to prevent "W" (write) keys from being removed during the data scan. While the data scan is running, there may not be a reliable base value for the storage parameter calculation Base calculator 334 may include one or more functions to receive one or more storage system parameter values from data scan 346. For example, base calculator 334 may, responsive to the full scan requested by log initiator 332, receive one or more aggregate property values, such as total storage capacity. It may be assumed that base calculator 334 may not generate an accurate storage parameter value, due to storage operations and related data property changes that may have occurred after initialization.

Parameter calculator 338 may include one or more functions that allow property service 324 to use property log 310 to generate one or more current parameter values based on property values stored in property log 310. More specifically, parameter calculator 338 may traverse property log 310 and read the log data key entries relevant to the storage parameter being calculated to generate an aggregate and/or iterative storage parameter value. Parameter calculator 338 may operate in conjunction with base calculator 334 for calculating accurate parameter values during initialization events.

For example, parameter calculator 338 may be initiated to calculate a current parameter value for total storage capacity based on the "data" property in property log 310. In some embodiments, parameter calculator 338 may start at a first entry of property log 310, corresponding to the earliest timestamp or largest inverse timestamp, and sequentially read key data entries with the selected property identifier and their respective precondition and postcondition values. Parameter calculator 338 may start from a default parameter value, such as 0, or an initialization parameter value (such as a known parameter value at the time the log was initiated) and iteratively modify the parameter value using the precondition values and postcondition values. In some embodiments, parameter calculator 338 may include a prior parameter value associated with an index key value in property log 310, such as an inverse timestamp at which the prior parameter value was calculated, and use both the prior parameter value and the index key value to begin its traversal. Similarly, parameter calculator 338 may stop at a defined index key value for a desired time for the parameter calculation, allowing historical parameter values to be calculated. For some storage parameter calculations, a value based on the property values is added or subtracted from the prior parameter value to iteratively calculate the new parameter value. However, more complex transfer functions between the property values and change to the parameter value are also possible.

In some embodiments, parameter calculator 338 may validate each log entry before modifying the parameter value based on the property change in the log entry. For example, parameter calculator 338 may compare the precondition value of the log entry being validated to the postcondition value of the prior log entry for the same object with the same property identifier, if any.

Parameter calculator 338 may include delta calculator 340 to calculate a delta value that represents the property change from the precondition value to the postcondition value. For example, the difference between the precondition value and the postcondition value may be calculated by subtracting the precondition value from the postcondition value.

Parameter calculator 338 may be initiated by one or more trigger conditions. For example, parameter calculator 338 may calculate and update storage parameters in real-time in response to a new key data entry with a relevant property being added to property log 310. As another example, parameter calculator 338 may be initiated by receiving a parameter request message from another system, function, or user. Parameter calculator 338 may initiate a parameter calculation in response to the initiation event of log initiator 332, where parameter calculator 338 may be triggered after the data scan has completed and base calculator 334 has received the resulting base parameter value. Upon receiving the parameter request, parameter calculator 338 may initiate a storage parameter calculation by searching for relevant key data entries in property log 310. As still another example, parameter calculator 338 may use one or more programmed intervals, such as elapsed time or a number of operations or log entries, to initiate a calculation. Other trigger conditions and trigger events may be possible and parameter calculator 338 may be configured to use different trigger conditions for different storage parameters, Parameter reporter 342 may store and communicate storage parameters calculated by parameter calculator 338 to other storage system management functions that use those parameters to generate additional actions. For example, one or more storage management functions within storage application 224 may use storage parameters, such as total storage capacity, as inputs, thresholds, or outputs for generating storage allocation decisions, such as load balancing or directing new write requests to an alternate storage location. In some embodiments, parameter reporter 342 may publish, transmit, or store results in a network accessible parameter file for use by other systems, such as third-party application 222. For example, third-party application 222 may include storage management and/or billing applications that use total storage capacity to determine allocation of storage space and/or charges based on storage usage. In some embodiments, parameter reporter 342 transmits storage parameters in a storage parameter message or data structure to other server systems, such as server system 220-1.

The methods of FIGS. 4-7 are now described. With reference to these methods, each of the operations shown and/or described may correspond to instructions stored in a computer memory or computer-readable storage medium, a customized logic chip, or other suitable implementation as discussed elsewhere herein. For example, the methods of FIGS. 4-7 may be implemented in a distributed storage system, such as DSS 200 in FIG. 2, using a computer system, such as computing system 300 in FIG. 3, with a storage application, such as storage application 224, executing the various methods as functions or operations within the storage application.

Figure 4:
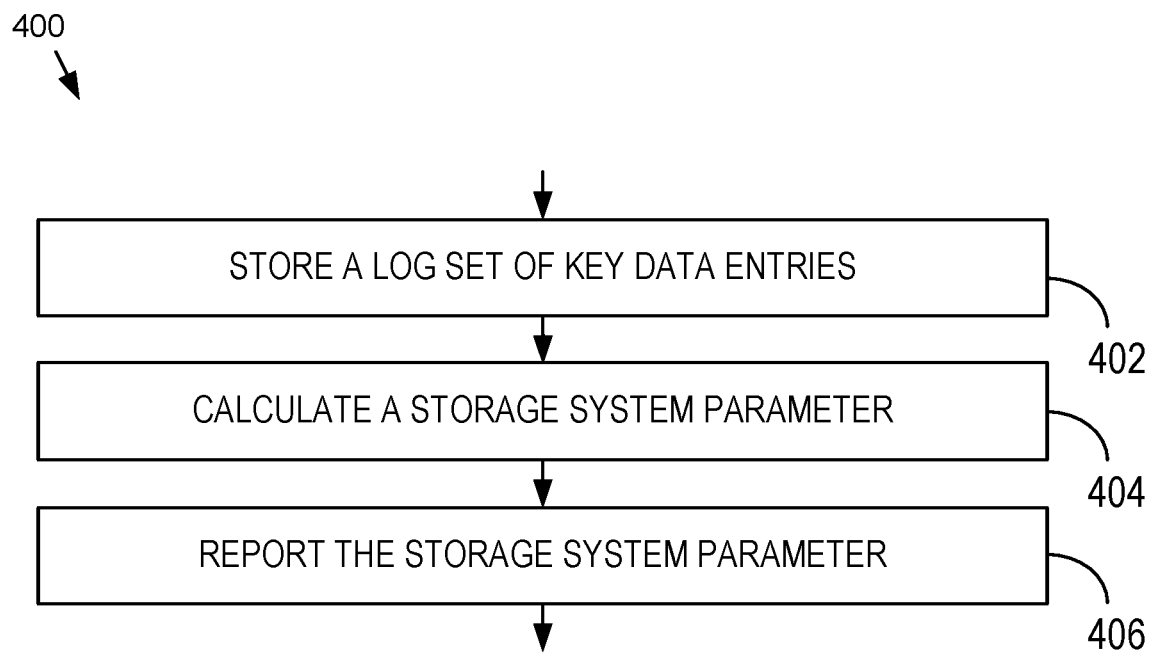
FIG. 4 is a flow chart of an example method for calculating and reporting a storage system parameter.

FIG. 4 is a flow chart of an example method 400 for calculating and reporting a storage system parameter. For example, storage application 224 may use property service 324 to calculate and report total storage capacity using data property values logged in property log 310.

At block 402, a computer system may store a log set of key data entries in a key data store. For example, as the computer system processes or receives notification of storage operations that impact data property values for one or more data objects, the computer system may write log entries into a key value-based log, where one or more log entries related to one or more properties comprise a set. Each key data entry in the log set may include a key value corresponding to the storage operation that it was generated in response to. For example, each key data entry may include a data object identifier for the data object that was the target of the storage operation, an inverse timestamp that corresponds to the time at which the storage operation was executed, and an operation identifier that identifies the type of storage operation it was, such as a write, read, delete, or other storage operation. Each key data entry may also include at least one precondition value and at least one postcondition value describing a property that may change because of the storage operation. For example, data object size may be changed by a write, read/modify/write, delete, or other operation and the precondition value may be the object size before the operation and the postcondition value may be the object size after the operation.

At block 404, the computer system may calculate a storage system parameter from the set of key data entries. For example, the set of key data entries may be traversed and the storage system parameter value may be calculated from the key data entries that include one or more properties related to the parameter calculation. Calculating the storage parameter may include using the precondition values and the postcondition values for each of the key data entries. For example, a difference between a precondition value and a postcondition value in a key data entry for a selected property may be added to a prior storage system parameter value for each key data entry in the set, resulting in a current value for the storage system parameter.

At block 406, the computer system may report the storage system parameter to other systems or functions that use the storage system parameter. For example, the storage system parameter may be stored to a register of parameter values utilized by multiple storage system management applications or sent as a message, parameter value, or call to another function in the computer system for responsive processing. In some embodiments, reporting the storage system parameter may cause a storage service to allocate storage operations across multiple object storage locations differently based on a change in the storage system parameter. For example, an object storage location that is above or below a storage capacity threshold may be allocated fewer or more new write operations to the storage location with the changed total storage capacity parameter value.

Figure 5:
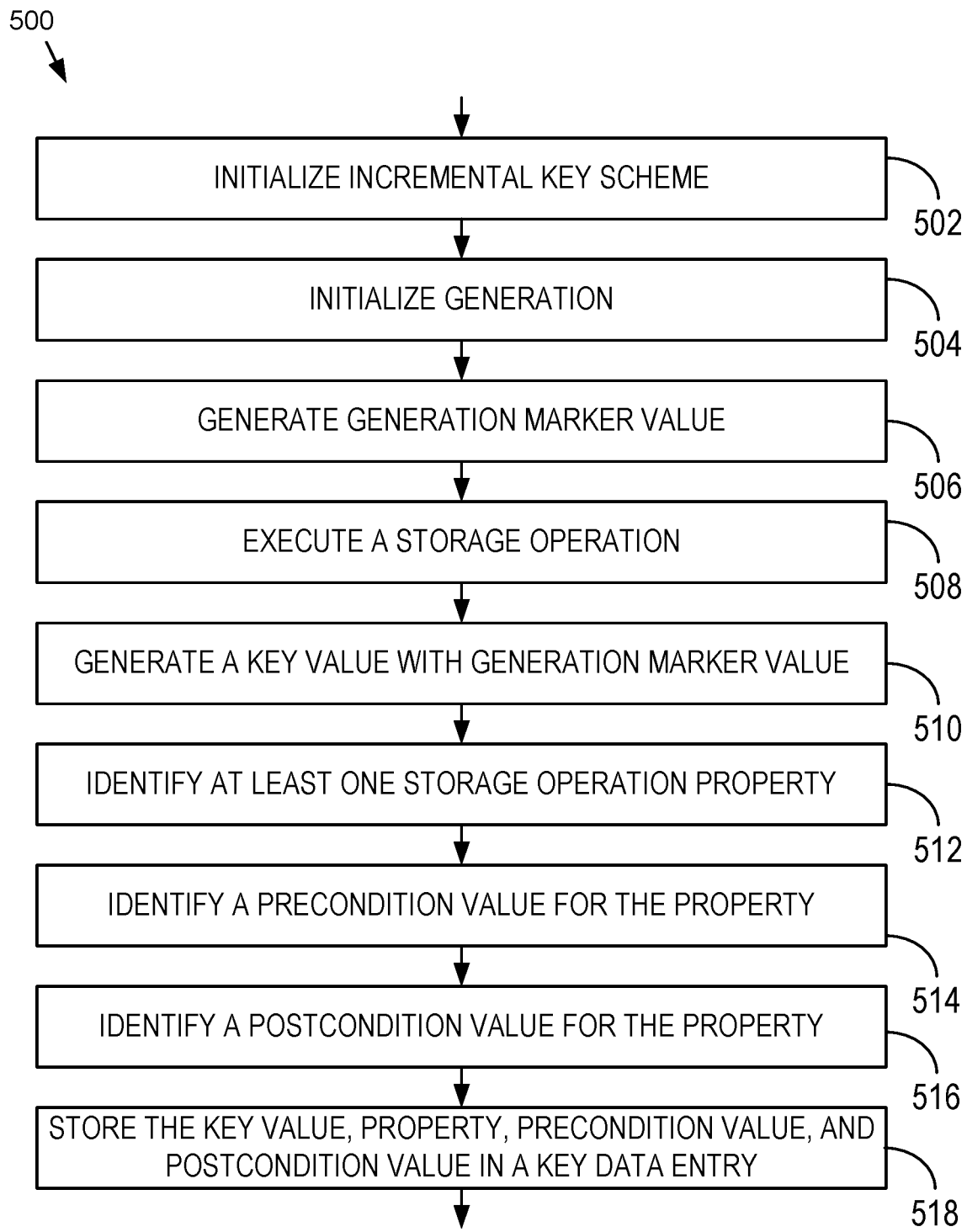
FIG. 5 is a flowchart of an example method for storing storage properties in a key value store.

FIG. 5 is a flowchart of an example method 500 for storing storage properties in a key value store in generation subsets. For example, storage application 224 may use property service 324 to generate a key data entry including property log information for property log 310 in key value store 230.

At block 502, a computer system may initialize an incremental key scheme. For example, the computer system may have previously used a different configuration for logging data properties. In response to a system request or the input of a system administrator, the computer system may define a new incremental key scheme based on property change values stored in key value data entries for use going forward.

At block 504, the computer system may initialize a generation of log entries. For example, new key value data entries going forward may be associated with an active generation subset for key data entry management and/or parameter calculation.

At block 506, the computer system may generate a generation marker value for the generation initialized at block 504. The generation marker may distinguish an active generation subset of key value data entries from a prior or base log subset of key value entries.

At block 508, the computer system may execute a storage operation. For example, a computer system in a distributed storage system may execute an object storage operation to write, delete, read, or otherwise manipulate a data object in the storage system. The storage operation may include any operation that creates, modifies, or removes a data element and/or related metadata in the distributed storage system. In addition to the primary effect of the storage operation on the stored data (or its retrieval or management), the storage operation may also impact one or more related properties, sometimes referred to as operation properties. For example, a write operation may allocate storage space to a data object, utilize processing, metadata, or other resources, relate to user, bucket, or system allocations, or have other system impacts that may be defined as properties of the operation. It may be beneficial to log one or more of these properties for calculating storage system parameters and/or managing the distributed storage system.

At block 510, the computer system may generate a key value including the generation marker value. For example, the key value may be related to the storage operation and provide an index value for describing that operation and have the generation marker value appended to the other values that makeup the key value. In some embodiments, the key value may include a data object identifier, an inverse timestamp, an operation identifier, and a generation marker as further described above.

At block 512, the computer system may identify at least one storage operation property from the storage operation. For example, a storage operation may generate or modify a data object with a data object size. Other storage operation properties may include metadata usage, operation counts, error/retry counts, resource usage (memory, processor, buffer, etc.), etc. In some embodiments, multiple operation properties may be defined and associated with each storage operation. A property identifier may be associated with each operation property and may be used to identify values associated with that property.

At block 514, the computer system may identify at least one precondition value for the property. At block 516, the computer system may identify at least one postcondition value for the property. The precondition and postcondition values may relate to the same property and assign a value to the property before the storage operation (precondition) and after the storage operation (postcondition). In some embodiments, blocks 514 and 516 may be executed for each property defined for the storage operation, such that each precondition and postcondition value pair are associated with the same property identifier and the property identifiers may be used to distinguish among multiple property values.

At block 518, the computer system stores the key value, precondition value, and postcondition value in a key data entry for the property log. For example, the key value may be stored as the index for the key data entry in the property log and the precondition value and postcondition value may be stored in the associated data instance. The computer system may also include property identifiers for identifying the storage operation property associated with the key data entry. In some embodiments, the property identifier may be associated with each of the precondition and postcondition values and the key data entry may include multiple properties designated by multiple property identifiers (each paired with precondition and postcondition values). In some embodiments, the log may be used for a single property and not use a property identifier and/or the property identifier may be associated with the key value rather than the data instance.

Figure 6:
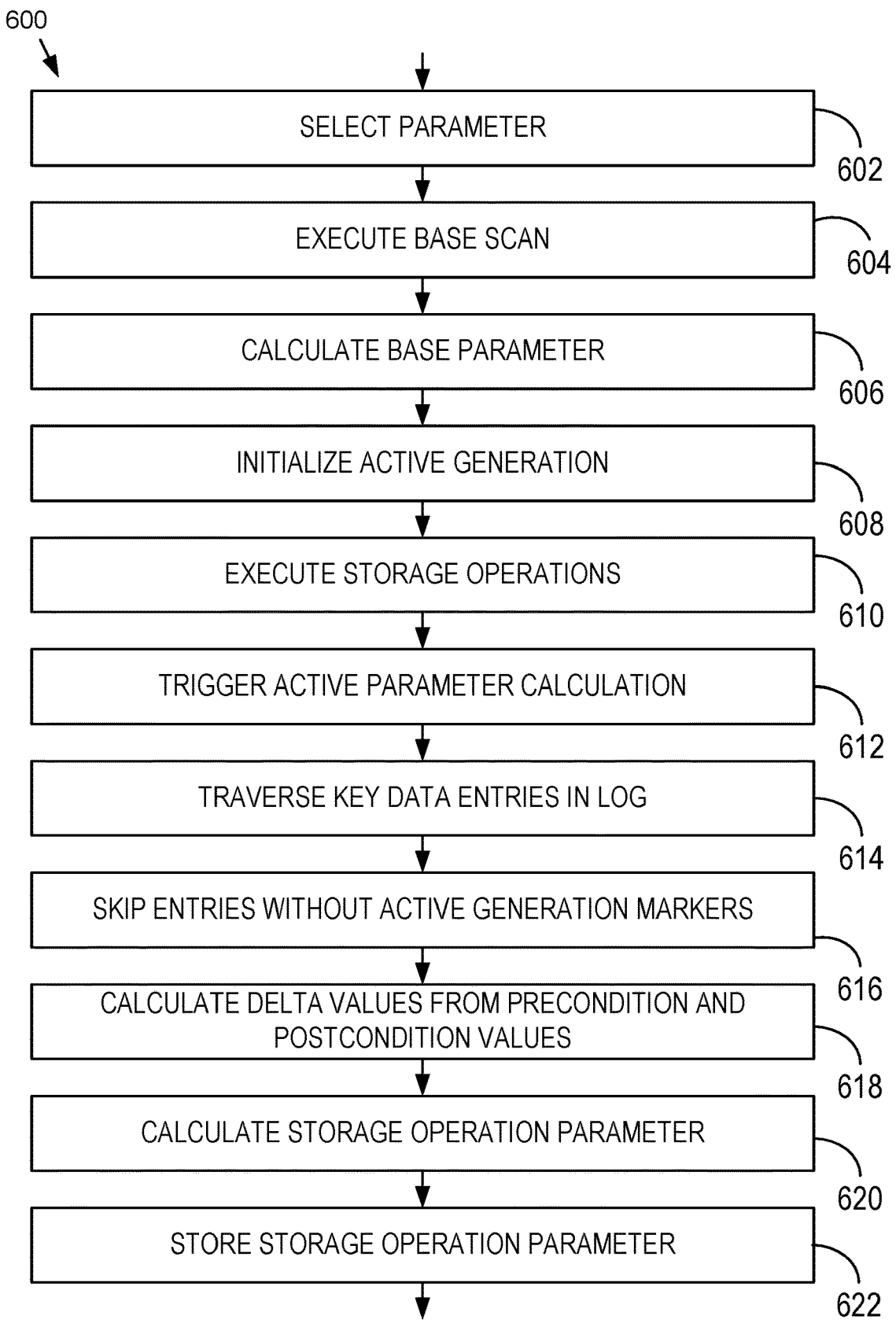
FIG. 6 is a flowchart of an example method for calculating and storing storage operation parameters.

FIG. 6 is a flowchart of an example method 600 for calculating and storing storage operation parameters. For example, storage application 224 may use property service 324 to generate and store storage operation parameters from property log 310 in key value store 230.

At blocks 602, the computer system may select a storage system parameter for calculation. For example, a configuration file, user request, or system call or message from another component in the distributed storage system may select for parameters that may be calculated from property log data and/or initiate such calculations.

At block 604, the computer system may execute a base scan of the target data store for one or more properties related to the selected storage system parameter. For example, in response to selection of the parameter, a full scan of the object data store may be initiated. In some embodiments, this base scan will be conducted against a prior or base generation subset of the property log data.

At block 606, the computer system may calculate a base parameter value for the selected parameter based on the data scan at block 604. For example, the full data scan may return the base storage capacity of the target data store based on the prior log subset, with some overage for garbage collection that has not yet completed. The base parameter may be calculated using an active scan of data objects, metadata, and/or a prior property log that may or may not use the current log scheme for the distributed data system.

At block 608, the computer system may initialize an active generation of log entries. For example, the active generation of log entries may include key value data entries in accordance with various embodiments described above for the key value store, including a generation marker that denotes the log entries as part of the active generation.

At block 610, the computer system may execute one or more storage operations. For example, a computer system in a distributed storage system may execute object storage operations to write, delete, read, or otherwise manipulate a data object in the storage system on an ongoing basis after initializing the active generation at block 608. In some embodiments, one or more data management functions, such as garbage collection, may be triggered to generate a desired set of storage operations.

At block 612, the computer system may trigger calculation of the storage system parameter using the property changes in the active generation log entries. Each storage operation parameter may be associated with and based on one or more operation properties found in the property log. In an embodiment with multiple properties in the log, the property or properties relevant to the parameter may be selected.

At block 614, the computer system may traverse key data entries in the log to identify and read relevant property values. For example, if the computer system is calculating total storage capacity used, the computer system may identify each key data entry containing the "data" property identifier to determine the current size of each object.

At block 616, the computer system may skip log entries without generation markers for the active generation. For example, while traversing the key data entries at block 614, the computer system may check the key value for the active generation marker value and, if the active generation marker value is not found, the property change values in that key value data entry may be skipped.

At block 618, the computer system may calculate delta values for each property and key data entry using the precondition values and the postcondition values. For example, the delta value may equal the postcondition value minus the precondition value.

At block 620, the computer system may calculate the storage operation parameter from the precondition and postcondition values for each log entry relevant to the parameter calculation based on the base storage system parameter value calculated at block 606. For example, starting from the base parameter value, each delta value for a selected data object and property may be added together and then the cumulative property value for each data object may be added to the base parameter value for a total storage system parameter.

At block 622, the computer system may store the calculated storage operation parameter. For example, the computer system may maintain a register, table, file, or other data structure for reporting storage operation parameters that may then be accessed and used by other functions and storage management operations.

Figure 7:
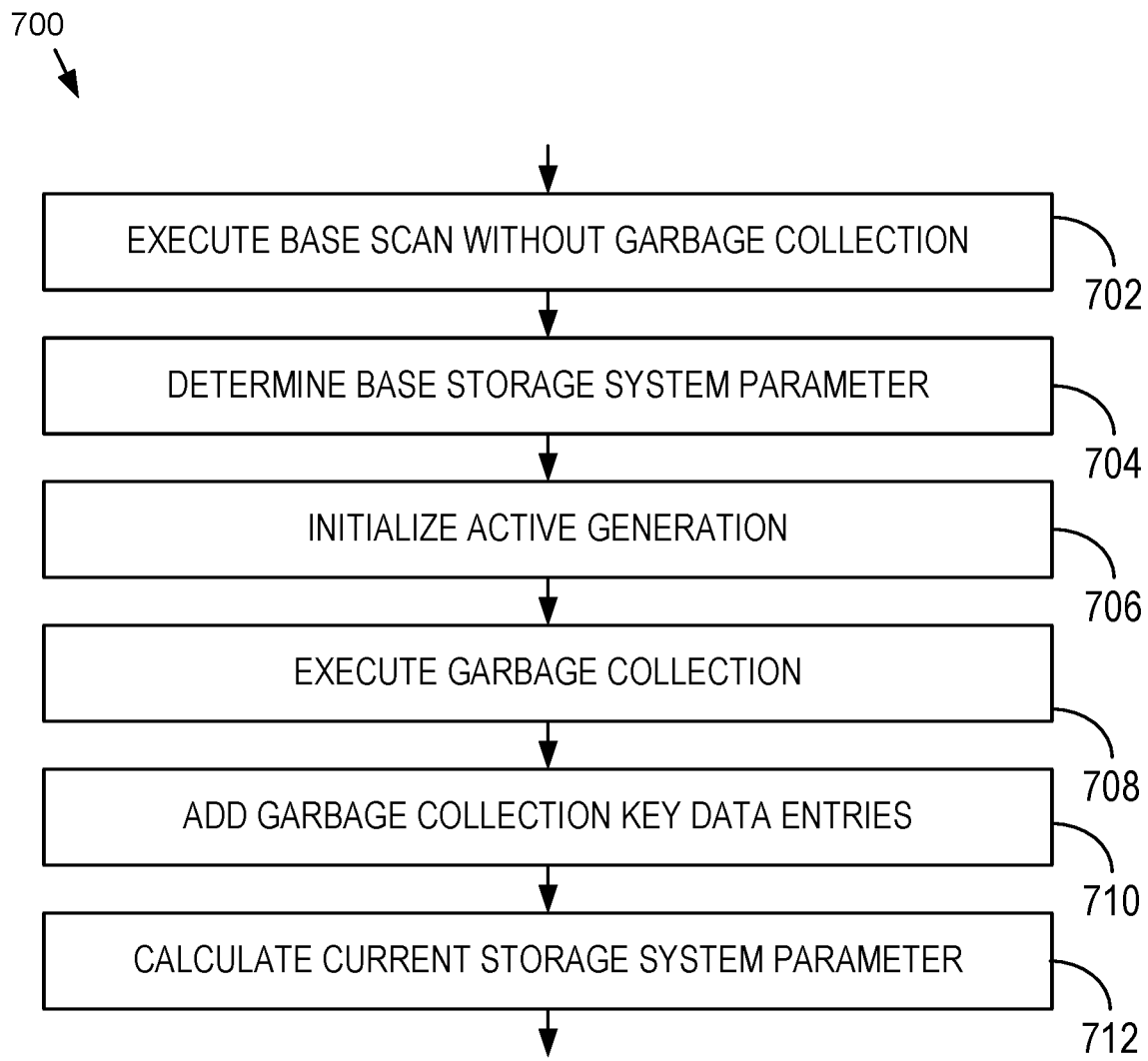
FIG. 7 is a flowchart of an example method for initializing a key value store for calculating storage operation parameters.

FIG. 7 is a flowchart of an example method 700 for initializing a key value store for calculating storage operation parameters. For example, storage application 224 may use property service 324 to generate and resolve key data entries in property log 310 in key value store 230.

At block 702, the computer system may execute a base scan without garbage collection. For example, a data scan operation may be initiated to calculate a desired storage system parameter, such as total storage capacity, using the target data store and/or related metadata. The data scan may specifically target one or more data properties related to the desired storage parameter or may include a general data scan that produces a general summary of storage system parameters and/or related data properties. In some embodiments, the base scan may serve as a final full count of the target storage system parameter and serve to bootstrap the incremental counting of that parameter using the generation markers. The base scan may count only the base generation. It may count all the key data entries without regard to interkey relations. It may count multiple keys for the same object name (e.g. A90W A80W, counting them both). It may count key data entries regardless of whether there are corresponding garbage keys (e.g. A90W and A80K) and counts the A90W. In some embodiments, this may result in overcounting in the base scan.

At block 704, the computer system may determine a base storage system parameter based on the base scan. For example, the data scan may output the desired base storage system parameter and/or output data property values from which the storage system parameter can be calculated. The base storage system parameter value resulting from the base scan may be expected to be inaccurate and may be corrected or updated to reflect present value going forward through the remaining blocks of method 700. In some embodiments, this data scan may be the final run of a full scan for the metadata database and the log may be used for calculating storage system parameters going forward.

At block 706, the computer system may initialize an active generation of log entries. For example, the active generation of log entries may include key value data entries in accordance with various embodiments described above for the key value store, including a generation marker that denotes the log entries as part of the active generation. Once initialized, the computer system may start generating active generation log entries in response to storage operations. In some embodiments, initiating of the base scan and initialization of the active generation may define a start entry for processing new log entries after the base scan.

At block 708, the computer system may execute garbage collection. For example, the computer system may complete garbage collection operations for all data elements marked for garbage collection, which may include data elements included in the base scan at block 702.

At block 710, the computer system may add garbage collection key data entries to the property log for the active generation. For example, each garbage collection operation may trigger log operations to record the completion of garbage collection for each effected data element. A cleanup operation may monitor for the garbage collection event and a removal operation may add a log entry that updates the properties of a deleted data object to reflect garbage collection.

At block 712, the current storage system parameter may be calculated based on the base storage system parameter and the property values in the active generation of the property log. For example, starting from the base storage system parameter value, the change value from each log entry in the active generation subset may increase or decrease the storage system parameter value until all entries are processed and a current storage system parameter value is determined.

In one example, a data object A of 100 kB may already be present in the metadata database before initiating the incremental property log and no new operations are received. In this case, a key entry, such as A_90_W_g1, may be present in the metadata database and there will be no g2 (active generation) entries in the log for data object A. The base scan at block 704 would accurately reflect the properties of data object A regardless of the other blocks.

In another example, data object A may be added after the data scan at block 704 and was not previously in the data store. In this case, no g1 (base generation) entries for data object A may be present in the metadata database and A_90_W_g2 may be present in the property log. The properties for data object A will not be present in the base scan at block 704 and be incrementally added to the base storage system parameter at block 712.

In another example, data object A has a write operation present in the metadata database at the data scan at block 704 and a delete operation after the active generation is initiated at block 706. In this case, a key entry, such as A_90_W_g1, may be present in the metadata database and there may be another key entry, such as A_80_K_g2, in the active log for data object A. After the data scan at block 704, the 100 kB for data object A would be part of the base storage system parameter calculation. Completion of blocks 706-710 may result in a garbage collection key data entry being stored in the log to reflect the deletion and garbage collection of data object A. The resulting calculation of the current storage system parameter at block 712 would be corrected by the log entry to adjust the current storage system parameter by minus 100 kB giving the correct end result of 0 kB.

In a final example, both the write (A_90_W_g1) and delete (A_80_K_g1) operations may be present at the time of the data scan at block 704. In this case, running the final data scan at block 704 without garbage collection may have a significant impact on calculation of the storage system parameter. In a worst case situation, garbage collection during the final scan could lead to an undetermined state: both keys could still be present if the GC did not yet process them during the final run, only the write key could be removed during the final run, or both the write and delete keys could be removed. To improve reliability of the storage system parameter calculation, no keys should be removed by garbage collection and the parameter should be calculated as if the K keys are not present. When garbage collection is run after the data scan, the K key will be processed as described above to assure that the storage system parameter is properly updated.

Figure 8:
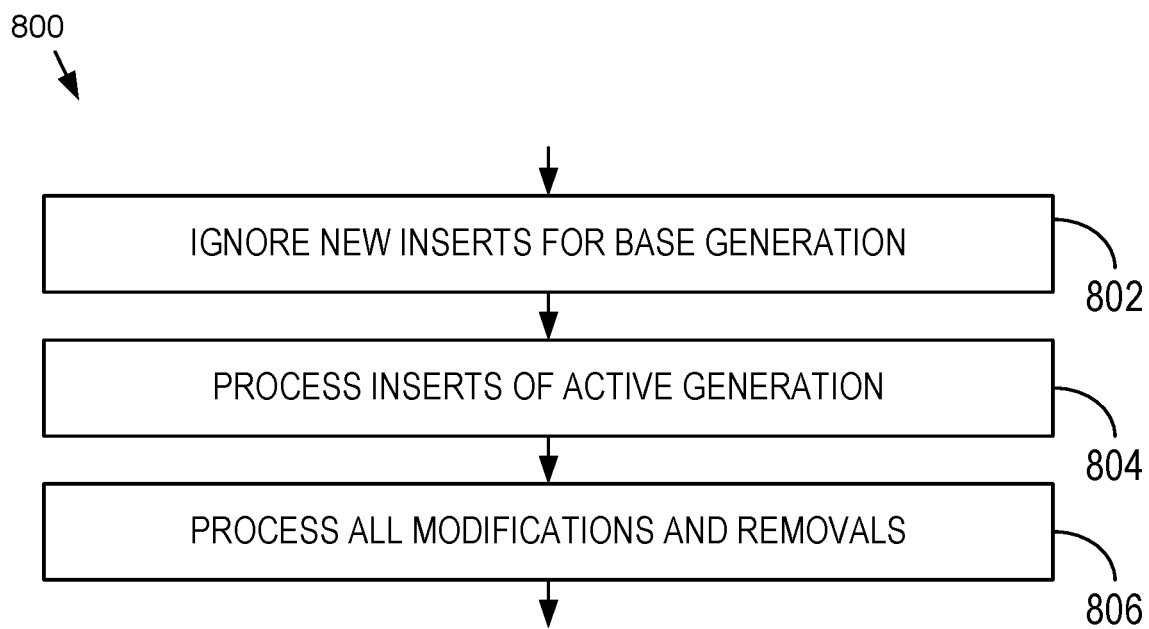
FIG. 8 is a flowchart of an example method for processing key value entries after base scan and initialization of active generation.

FIG. 8 is a flowchart of an example method 800 for processing key value entries after base scan and initialization of the active generation. For example, storage application 224 may use log operations 328 to generate and resolve key data entries in property log 310 in key value store 230.

At block 802, the computer system ignores new inserts for the base generation and/or any generations prior to the active generation. For example, a subsequent log entry to overwrite a data object in the prior generation may be ignored, since these are counted in the base scan. In some embodiments, logical markers, such as kill markers, that only impact the visibility of objects and not their allocation (or reported capacity) may also be ignored.

At block 804, the computer system processes new inserts with the active generation markers. For example, when a new object is written, it will be logged and processed as normal. Active generation key value entries were not included in the base scan.

At block 806, the computer system processes all modifications and removals, for both active generation and base or prior generation operations. For example, if the size of an object is modified or garbage collection removes an object, those key value entries are processed and used to modify the incremental changes over the base value generated in the base scan.

To ease understanding, some elements (e.g., requests, identifiers, timestamps, operations, etc.), may be referred to in the description and/or the claims using the labels first, second, third, etc. These labels are intended in some cases to help to distinguish the elements, but do not necessarily imply any particular order or ranking unless indicated otherwise.

Referring again to FIG. 3, in some embodiments, the key data store controller 320 may determine that the number of object keys stored in the ordered set of object key entries exceeds a predetermined threshold. The threshold may reflect the amount of storage space that can be acceptably utilized (e.g., a percentage of utilized storage space relative to a maximum). Responsive to such a determination, the key data store controller 320 may add an additional shard, in which case the key data store controller 320 may redistribute the object keys between the shards to help ensure that the object keys are more evenly spread between the database shards. In some cases, the key data store controller 320 may update a range table to accurately represent which object keys are stored on which database shards. In further embodiments, the key data store controller 320 may create new shards or re-shard the existing database shards for additional reasons including, but not limited to, improve performance of key data store 230, compliance to rules/laws/regulations, security policies, and/or load requirements of the key data store 230, and/or other suitable purposes.

The processor(s) 302 may execute software instructions by performing various input/output, logical, and/or mathematical operations. The processor(s) 302 may have various computing architectures to process data signals including, for example, a complex instruction set computer (CISC) architecture, a reduced instruction set computer (RISC) architecture, and/or an architecture implementing a combination of instruction sets. The processor(s) 302 may be physical and/or virtual, and may include a single processing unit and/or core or plurality of processing units and/or cores. In some implementations, the processor(s) 302 may be capable of generating and providing electronic display signals to a display device (not shown), supporting the display of images, capturing and transmitting images, performing complex tasks including various types of feature extraction and sampling, etc. In some embodiments, the processor(s) 302 may be coupled to the memor(ies) 304 via a communication bus 306 to access data and instructions therefrom and store data therein. The bus 306 may couple the processor(s) to the other components of the computing system 300, for example, memor(ies) 304, communication unit(s) 308, physical storage devices and/or storage systems (e.g., object storage 240, key data store 230).

The memor(ies) 304 may store and provide access to data to the other components of the computing system 300. The memor(ies) 304 may store instructions and/or data that may be executed by the processor(s) 302. For example, the memor(ies) 304 may store an instance of the storage application 224, software implementing the key data store 230, cached keys and objects, parameters, operating system(s), drivers, databases, and/or other software applications, etc. The memor(ies) 304 may be coupled to the bus 306 for communication with the processor(s) 302 and the other components of computing system 300.

The memor(ies) 304 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 302. In some embodiments, the memor(ies) 304 may include one or more of volatile memory and non-volatile memory (e.g., RAM, ROM, flash, solid state drive, hard drive, optical disc, tape, magnetic diskette, etc.). It should be understood that the memor(ies) 304 may include a single device or may include multiple types of devices and configurations.

The communication unit 308 may include one or more interface devices for wired and wireless communication with the network 210 and the other entities and/or components of the system 200 including, for example, the client systems 202, server systems 220, object storage 240, etc. For instance, the communication unit 308 may include, but is not limited to, CAT-type interfaces; wireless transceivers for sending and receiving signals using Wi-Fi™; Bluetooth®, cellular communications, etc.; USB interfaces; various combinations thereof; etc. In some embodiments, the communication unit 308 can link the processor(s) 302 to the network 210, which may in turn be coupled to other processing systems. The communication unit 308 can provide other connections to the network 210 and to other entities of the system 300 using various communication protocols, including, for example, those discussed elsewhere, herein. In some instances, the communication unit 308 includes a wired port and a wireless transceiver. The communication unit 308 also provides other connections to the network 210 for distribution of files and/or media objects using various network protocols, such as those discussed elsewhere herein.

In some embodiments, the computing system 300 may include a software communication mechanism implemented via the network 210 and/or communication bus 306 that can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., secure shell (SSH), HTTPS, etc.).

In the above description, for purposes of explanation, numerous specific details are set forth to provide a thorough understanding of the various aspects of different example embodiments. It should be evident, however, that any particular example embodiment may in various cases be practiced without all of the specific details and/or with variations, permutations, and combinations of the various features and elements described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

It should also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It should also be understood that the term "and/or" as used herein refers to and encompasses any and/or all possible combinations of one or more of the associated listed items. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A storage system, comprising:
    at least one storage node configured to execute storage operations;
    a key data store comprising a log configured to include a set of key data entries, wherein:
        each key data entry of the key data entries includes:
            a key value corresponding to at least one storage operation; and
            at least one property value related to the at least one storage operation;
        a second subset of the key data entries of the set of key data entries includes a second generation marker value configured to designate each key data entry in the second subset; and
        a first subset of the key data entries of the set of key data entries omits the second generation marker value;
    at least one memory;
    at least one processor; and
    a storage application executable by the at least one processor using the at least one memory to perform operations comprising:
        calculating a base storage system parameter from the key data store;
        initializing an incremental key scheme, wherein:
            a prior log subset of the key data entries is in the key data store at initialization; and
            the prior log subset includes the first subset of the key data entries of the set of key data entries;
        adding, responsive to at least one storage operation executed after initialization, at least one new key data entry in the second subset;
        calculating a current storage system parameter using:
            the base storage system parameter; and
            the at least one property value of the key data entries in the second subset of the key data entries; and
        reporting the current storage system parameter.

2. The storage system of claim 1, wherein the key value includes:
    a data object identifier;
    an inverse timestamp;
    an operation identifier; and
    a generation marker, wherein the generation marker of the second subset includes the second generation marker value.

3. The storage system of claim 1, wherein:
    the at least one property value of each key data entry of the key data entries in the second subset comprises:
        at least one precondition value; and
        at least one postcondition value; and
    calculating the current storage system parameter includes calculating a difference between the at least one precondition value and the at least one postcondition value.

4. The storage system of claim 3, wherein:
    the at least one precondition value and the at least one postcondition value are associated with at least one operation property; and
    each key data entry of the key data entries in the second subset further includes at least one operation property for the at least one precondition value and the at least one postcondition value.

5. The storage system of claim 1, wherein:
    the storage application is further executable to perform operations comprising:
        executing garbage collection using the key data store; and
        adding, responsive to executing garbage collection, garbage collection key data entries to the set of key data entries, wherein garbage collection key data entries include the second generation marker value;
    calculating the base storage system parameter is based on a data scan of the key data store without garbage collection; and
    calculating the current storage system parameter is performed responsive to adding garbage collection key data entries to the set of key data entries.

6. The storage system of claim 1, wherein:
    the at least one property value of the new key data entry comprises:
        at least one precondition value; and
        at least one postcondition value; and
    calculating the current storage system parameter includes calculating a difference between the at least one precondition value and the at least one postcondition value.

7. The storage system of claim 6, wherein:
    the current storage system parameter is storage capacity; and
    the base storage system parameter is a base storage capacity at initialization.

8. The storage system of claim 1, wherein:
the set of key data entries includes a plurality of operating generations of key data entries corresponding to a plurality of sequential operating periods; and
each of the plurality of operating generations corresponds to a generation subset of key data entries that include a generation marker value configured to designate each of the key data entries in the generation subset.

9. A system, comprising:
at least one storage node configured to execute storage operations;
a key data store comprising a log including a set of key data entries, wherein:
   each key data entry of the key data entries includes:
      a key value corresponding to at least one storage operation; and
      at least one property value related to the at least one storage operation;
   a second subset of the key data entries of the set of key data entries includes a second generation marker value configured to designate each of the key data entries in the second subset; and
   a first subset of the key data entries of the set of key data entries does not include the second generation marker value;
means for calculating a base storage system parameter from a data scan of the key data store;
means for initializing an incremental key scheme, wherein:
   a prior log subset of the key data entries is in the key data store at initialization; and
   the prior log subset includes the first subset of the key data entries of the set of key data entries:
means for adding, responsive to at least one storage operation executed after initialization, at least one new key data entry in the second subset;
means for calculating a current storage system parameter from the base storage system parameter and property values of the second subset of key data entries; and
means for reporting the current storage system parameter.

10. The system of claim 9, wherein:
the at least one property value of each key data entry of the key data entries in the second subset comprises:
   at least one precondition value; and
   at least one postcondition value; and
the means for calculating the current storage system parameter includes means for calculating a difference between the at least one precondition value and the at least one postcondition value.

11. The system of claim 9, further comprising:
means for executing garbage collection using the key data store; and
means for adding, responsive to garbage collection, garbage collection key data entries to the set of key data entries, wherein:
   garbage collection key data entries include the second generation marker value;
   calculating the base storage system parameter from the key data store is executed without garbage collection; and
   calculating the current storage system parameter is performed responsive to adding garbage collection key data entries to the set of key data entries.

12. The system of claim 11, wherein:
the at least one property value of the new key data entry comprises:
   at least one precondition value; and
   at least one postcondition value; and
calculating the current storage system parameter includes calculating a difference between the at least one precondition value and the at least one postcondition value.

13. A computer-implemented method, comprising:
providing a key data store comprising a log configured to include a set of key data entries, wherein:
   each key data entry of the set of key data entries includes:
      a key value corresponding to at least one storage operation; and
      at least one property value related to the at least one storage operation;
   a second subset of the key data entries of the set of key data entries includes a second generation marker value configured to designate each key data entry in the second subset; and
   a first subset of the key data entries of the set of key data entries omits the second generation marker value;
calculating, without garbage collection, a base storage system parameter from the key data store;
executing garbage collection using the key data store;
adding, responsive to executing garbage collection, garbage collection key data entries to the set of key data entries, wherein garbage collection key data entries include the second generation marker value;
calculating, responsive to executing garbage collection, a current storage system parameter from:
   the base storage system parameter; and
   the at least one property value of the second subset of key data entries; and
reporting the current storage system parameter.

14. The computer-implemented method of claim 13, wherein the key value includes:
a data object identifier;
an inverse timestamp;
an operation identifier; and
a generation marker, wherein the generation marker of the second subset includes the second generation marker value.

15. The computer-implemented method of claim 14, wherein the generation marker of the first subset includes a first generation marker value.

16. The computer-implemented method of claim 13, wherein:
the at least one property value of each key data entry of the key data entries in the second subset comprises:
   at least one precondition value; and
   at least one postcondition value; and
calculating the current storage system parameter includes calculating a difference between the at least one precondition value and the at least one postcondition value.

17. The computer-implemented method of claim 16, wherein:
the at least one precondition value and the at least one postcondition value are associated with at least one operation property; and
each key data entry of the key data entries in the second subset further includes at least one operation property for the at least one precondition value and the at least one postcondition value.

18. The computer-implemented method of claim 13, further comprising:

initializing an incremental key scheme, wherein a prior log subset of the key data entries is in the key data store at initialization; and adding, responsive to at least one storage operation executed after initialization, at least one new key data entry in the second subset.

19. The computer-implemented method of claim 18, wherein:

the current storage system parameter is storage capacity; and the base storage system parameter is a base storage capacity at initialization.

20. The computer-implemented method of claim 13, wherein:

the set of key data entries includes a plurality of operating generations of key data entries corresponding to a plurality of subsequent operating periods; and each operating generation of the plurality of operating generations corresponds to a generation subset of key data entries that include a generation marker value configured to designate each key data entry of the key data entries in the generation subset.

\* \* \* \* \*